(12) United States Patent
Tsai et al.

(10) Patent No.: US 8,545,946 B2
(45) Date of Patent: *Oct. 1, 2013

(54) LIQUID CRYSTAL ALIGNMENT SOLUTION

(75) Inventors: Min-Ruei Tsai, Kaohsiung (TW); Wen-Chung Chu, Kaohsiung County (TW); Chia-Wen Chang, Tainan (TW); Ming-Chih Lai, Taichung County (TW)

(73) Assignee: Daxin Materials Corporation, Taichung (TW)

( * ) Notice: Subject to any disclaimer, the term of this patent is extended or adjusted under 35 U.S.C. 154(b) by 332 days.

This patent is subject to a terminal disclaimer.

(21) Appl. No.: 12/732,172

(22) Filed: Mar. 25, 2010

(65) Prior Publication Data

US 2010/0243955 A1    Sep. 30, 2010

(30) Foreign Application Priority Data

Mar. 31, 2009  (TW) .............................. 98110664 A

(51) Int. Cl.
*C09K 19/56* (2006.01)
*G02F 1/1337* (2006.01)
*C08G 73/10* (2006.01)
*C08G 73/14* (2006.01)
*C08L 79/08* (2006.01)

(52) U.S. Cl.
USPC ...... 428/1.25; 428/1.23; 428/1.26; 252/299.4

(58) Field of Classification Search
USPC ............. 428/1.2, 1.23, 1.25, 1.26; 252/299.4
See application file for complete search history.

(56) References Cited

U.S. PATENT DOCUMENTS

| | | |
|---|---|---|
| 5,612,450 A | 3/1997 | Mizushima et al. |
| 5,969,055 A | 10/1999 | Nishikawa et al. |
| 6,685,997 B1 | 2/2004 | Murata et al. |
| 6,753,048 B2 | 6/2004 | Katsumura et al. |
| 6,946,169 B1 | 9/2005 | Tanioka et al. |
| 7,122,226 B2 | 10/2006 | Shimizu et al. |

FOREIGN PATENT DOCUMENTS

| | | |
|---|---|---|
| CN | 1306222 | 8/2001 |
| CN | 1483722 | 3/2004 |
| CN | 1723413 | 1/2006 |
| JP | 05-072539 | 3/1993 |
| JP | 2001296525 | 10/2001 |
| JP | 2003295194 | 10/2003 |
| JP | 2005275118 | 10/2005 |
| WO | 2008-078796 | 7/2008 |
| WO | 2008-117615 | 10/2008 |
| WO | 2008-117759 | 10/2008 |

OTHER PUBLICATIONS

English translation by computer for JP 2003-295194 (2003), http://www4.ipdl.inpitgo.jp/Tokujitu/PAJdetail.ipdl?N0000=60&N0120=01&N2001=2&N3001=2003-295194.*

English translation by computer for KR 10-0798245 (2008), which is equivalent JP 2001-296525, http://kposd.kipo.go.kr:8088/up/submain.jsp.*

"Office Action of Japan Counterpart Application", issued on Feb. 14, 2012, p. 1-p. 2.

"First Office Action of China Counterpart Application", issued on Jul. 2, 2012 p. 1-p. 6.

"Office Action of Taiwan Counterpart Application", issued on Aug. 23, 2012, p. 1-p. 6.

* cited by examiner

*Primary Examiner* — Shean C Wu
(74) *Attorney, Agent, or Firm* — Jianq Chyun IP Office

(57) ABSTRACT

A liquid crystal alignment solution is provided, including at least one polymer selected from the group consisting of a polyamide acid-polyamide acid polymer represented by formula (A), a polyimide-polyamide acid polymer represented by formula (B) and a polyimide-polyimide polymer represented by formula (C), as defined in the contexts.

11 Claims, No Drawings

LIQUID CRYSTAL ALIGNMENT SOLUTION

CROSS-REFERENCE TO RELATED APPLICATION

This application claims the priority benefit of Taiwan application serial no. 98110664, filed on Mar. 31, 2009. The entirety of the above-mentioned patent application is hereby incorporated by reference herein and made a part of specification.

BACKGROUND OF THE INVENTION

1. Field of Invention

The present invention relates to a liquid crystal alignment solution and more particularly to a liquid crystal alignment solution which can enhance the performance of a liquid crystal display device.

2. Description of Related Art

A liquid crystal display (LCD) is a display device utilizing the characteristics of liquid crystal molecules. The orientation of liquid crystal molecules is changed as an electric field is changed, so as to control the light transmitted through the liquid crystal layer to produce an image. The liquid crystal display becomes the mainstream in recent years due to the advantages of small volume, light weight, low power consumption and good display quality.

The main fabrication process of the liquid crystal display includes fabricating a liquid crystal panel and assembling a liquid crystal module (LCM). The method of forming the liquid crystal panel mainly includes sealing liquid crystal molecules between a color filter serving as an upper substrate and a thin film transistor (TFT) serving as a lower substrate. It is important for the liquid crystal display to have the long axial direction of liquid crystal molecules aligned with the surface of the substrate at a pre-tilt angle uniformly. The material which can orient liquid crystal molecules at a pre-tilt angle is called an alignment layer.

Two typical fabrication methods of forming the alignment layer are known in the industry. The first method is forming an inorganic film by steam depositing an inorganic material. For example, the film is formed by an oblique angle deposition of silicon oxide on a substrate, and liquid crystal molecules are oriented in the direction of deposition. The above-mentioned method can obtain a uniform orientation of liquid crystal molecules, but it does not meet the economics of industry. The second method is coating an organic film on the surface of a substrate, and then rubbing the organic film by a rubber or a cloth (cotton, nylon or polyester) to determine the orientation; thus, liquid crystal molecules are oriented in the direction of rubbing. This method is simple and easy to obtain a uniform orientation of liquid crystal molecules, so it is widely used in the industry. The polymer for forming the organic film is polyvinylalcohol (PVA), polyethylene oxide (PEO), polyamide (PA) or polyimide (PI), for example. Due to the chemical resistance and thermal stability, polyimide is the most frequently used material as an alignment layer material.

Conventionally, when a voltage is applied to the liquid crystal display device, the ionic electrons are absorbed by the alignment layer. However, when the voltage is interrupted, the ionic electrons are not separated from the alignment layer completely so that the remaining image is resulted. Therefore, the recent development of the alignment layer material mainly focuses on reducing the remaining image.

SUMMARY OF THE INVENTION

Accordingly, the present invention provides a liquid crystal alignment solution, and the formed liquid crystal alignment layer has the characteristics of stable pre-tilt angle, high contrast ratio, high voltage holding ratio (VHR), low residual direct current (RDC), good rubbing property and high reliability; and thus, the performance of the liquid crystal display device is enhanced.

The present invention provides a liquid crystal alignment solution including at least one polymer selected from the group consisting of a polyamide acid-polyamide acid polymer represented by formula (A), a polyimide-polyamide acid polymer represented by formula (B) and a polyimide-polyimide polymer represented by formula (C),

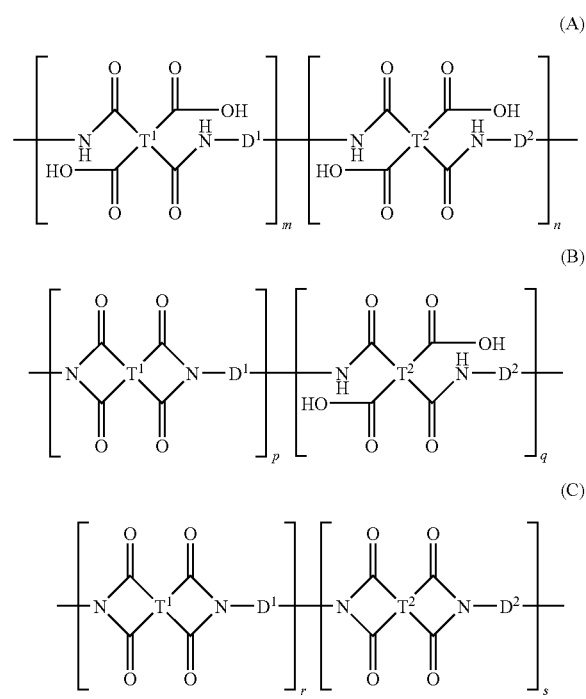

in which $T^1$ and $T^2$ are each independently a tetravalent organic group; m<n; p<q; r<s; at least one of $D^1$ and $D^2$ is selected from the group consisting of formulae (1) to (15),

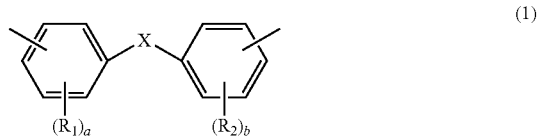

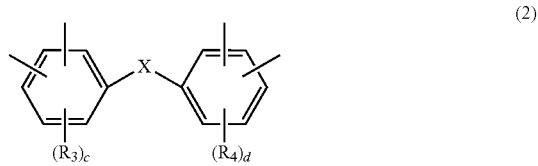

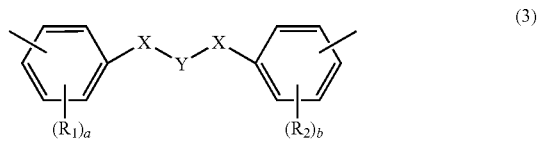

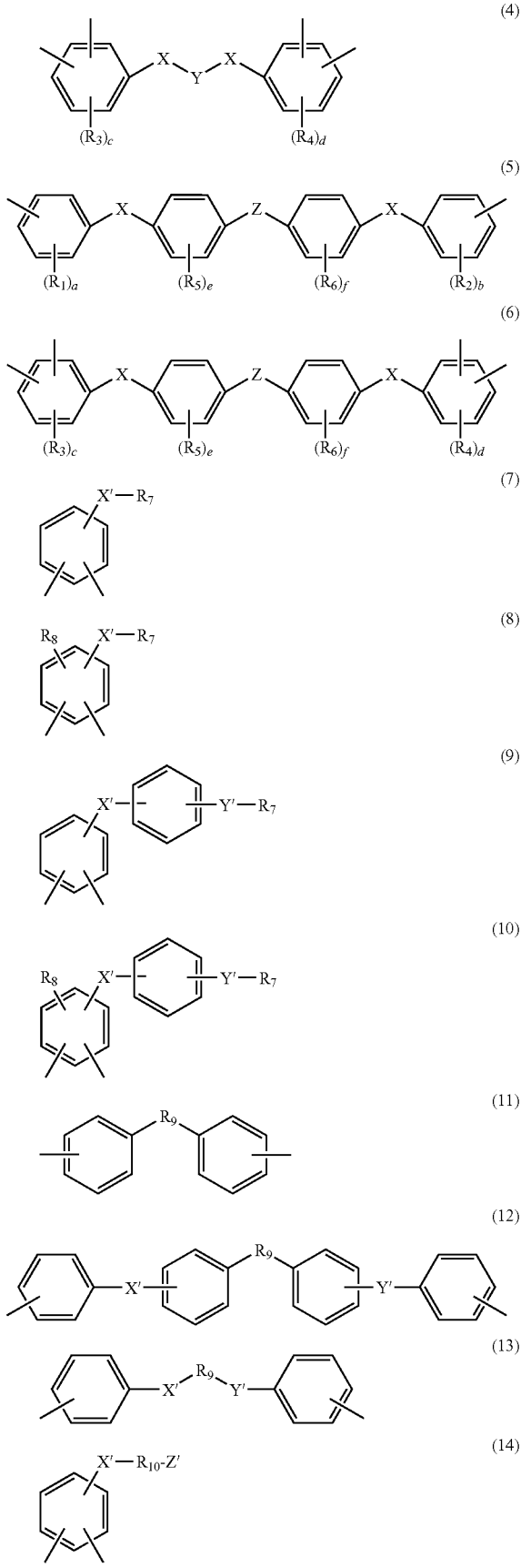

in which $R_1$, $R_2$, $R_3$, $R_4$, $R_5$ and $R_6$ are each independently a monovalent organic group, a halogen atom or a hydrogen atom; $R_7$ is a monovalent $C_{4-40}$ alicyclic group or a monovalent $C_{8-20}$ aliphatic group; $R_8$, $R_{11}$, $R_{12}$, $R_{13}$, $R_{14}$ and $R_{15}$ are each independently a halogen atom or a monovalent organic group; $R_9$ and $R_{10}$ are each independently a divalent $C_{4-40}$ alicyclic group; X is —O—, —S—, —SO—, —$SO_2$— or —CO—; Y is a divalent organic group; Z is a divalent organic group, —O—, —S—, —SO—, —$SO_2$— or —CO—; X' and Y' are each independently a divalent group selected from the group consisting of —O—, —NH—, —S—, —CO—, —COO—, —COO—, —NHCO— and —CONH—; Z' is a monovalent group selected from the group consisting of —$CF_3$, —CN, $COCH_3$, —COOH, —$NO_2$, $SOCH_3$, —$SO_2CH_3$, —$OCF_3$, —F and —Cl; A is a divalent group selected from the group consisting of —O—, —NH—, —S—, —CO—, —COO—, —OCO—, —NHCO— and —CONH—; a, b, e and f are each independently an integer from 0 to 4; c and d are each independently an integer from 0 to 3; and a' and b' are each independently an integer larger than or equal to 1.

According to an embodiment of the present invention, p is larger than or equal to 0.2.

According to an embodiment of the present invention, $D^1$ is selected from one of a first group consisting of formulae (1) to (6) and a second group consisting of formulae (7) to (15), and $D^2$ is selected from the other of the first group and the second group.

In the present invention, the polymer for forming the liquid crystal alignment solution has a group of the groups of formulae (1) to (6) and/or another group of the groups of formulae (7) to (15), and thus, the liquid crystal alignment solution of the present invention helps to reduce the remaining image of the liquid crystal display device, and the liquid crystal display device has the characteristics of high reliability, high contrast ratio, high brightness, high voltage stability and longer life. Further, the liquid crystal alignment solution has very stable pre-tilt angle effect, thereby enabling the liquid crystal display device to have very stable alignment performance.

In order to make the aforementioned and other objects, features and advantages of the present invention comprehensible, a preferred embodiment accompanied with formulae is described in detail below.

DESCRIPTION OF EMBODIMENTS

The liquid crystal alignment solution (or a mixture) of the present invention includes at least one polymer selected from the group consisting of a polyamide acid-polyamide acid polymer represented by formula (A), a polyimide-polyamide acid polymer represented by formula (B) and a polyimide-polyimide polymer represented by formula (C),

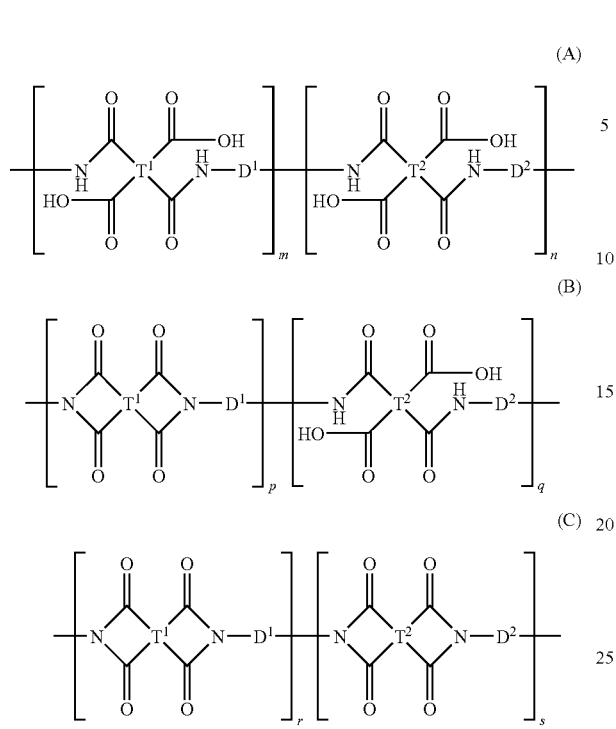

(A)

(B)

(C)

in which T¹ and T² are each independently a tetravalent organic group; m<n; p<q; r<s; m≥0, n≥0, p>0, q>0, r≥0, s≥0; at least one of D¹ and D² is selected from the group consisting of formulae (1) to (15),

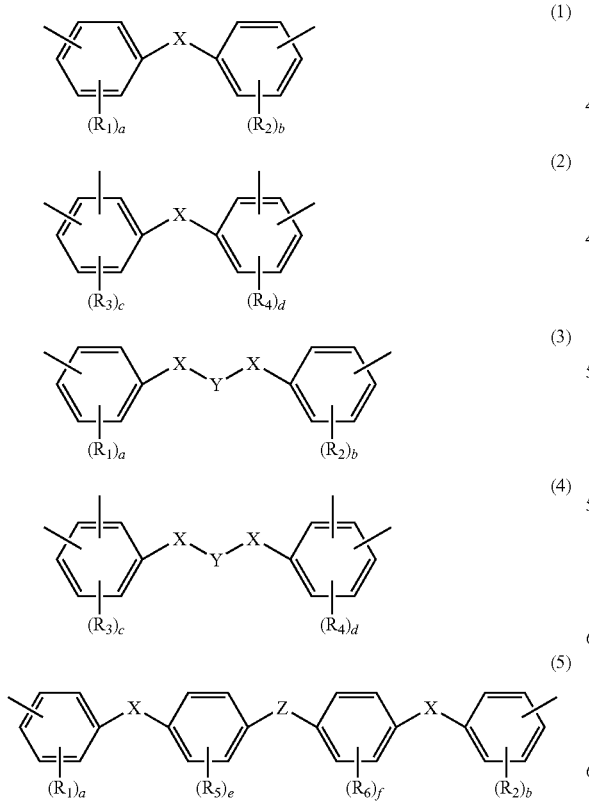

(1)

(2)

(3)

(4)

(5)

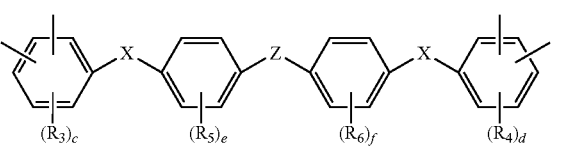

(6)

(7)

(8)

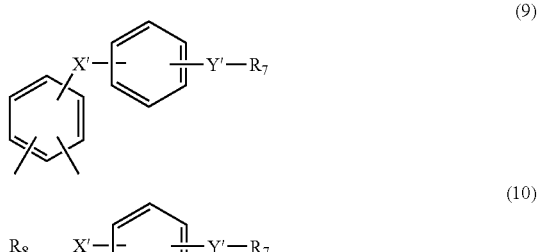

(9)

(10)

(11)

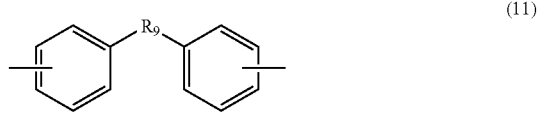

(12)

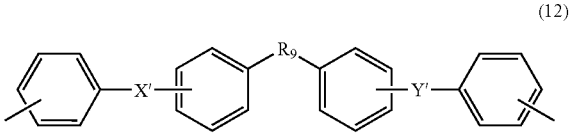

(13)

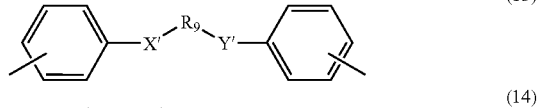

(14)

(15)

in which $R_1$, $R_2$, $R_3$, $R_4$, $R_5$ and $R_6$ are each independently a monovalent organic group, a halogen atom or a hydrogen atom; $R_7$ is a monovalent $C_{4-40}$ alicyclic group or a monovalent $C_{8-20}$ aliphatic group; $R_8$, $R_{11}$, $R_{12}$, $R_{13}$, $R_{14}$ and $R_{15}$ are each independently a halogen atom or a monovalent organic group; $R_9$ and $R_{10}$ are each independently a divalent $C_{4-40}$ alicyclic group; X is —O—, —S—, —SO—, —SO$_2$— or —CO—; Y is a divalent organic group; Z is a divalent organic group, —O—, —S—, —SO—, —SO$_2$— or —CO—; X' and Y' are each independently a divalent group selected from the group consisting of —O—, —NH—, —S—, —CO—, —COO—, —COO—, —NHCO— and —CONH—; Z' is a monovalent group selected from the group consisting of —CF$_3$, —CN, COCH$_3$, —COON, —NO$_2$, SOCH$_3$, —SO$_2$CH$_3$, —OCF$_3$, —F and —Cl; A is a divalent group selected from the group consisting of —O—, —NH—, —S—, —CO—, —COO—, —COO—, —NHCO— and —CONH—; a, b, e and f are each independently an integer from 0 to 4; c and d are each independently an integer from 0 to 3; and a' and b' are each independently an integer larger than or equal to 1.

In an embodiment, $D^1$ is selected from one of a first group consisting of formulae (1) to (6) and a second group consisting of formulae (7) to (15), and $D^2$ is selected from the other of the first group and the second group. In other words, when $D^1$ is one of formulae (1) to (6), $D^2$ is one of formulae (7) to (15); or when $D^1$ is one of formulae (7) to (15), $D^2$ is one of formulae (1) to (6).

When the polyamide acid-polyamide acid polymer represented by formula (A), the polyimide-polyamide acid polymer represented by formula (B) and the polyimide-polyimide polymer represented by formula (C) have one of groups of formula (1) to (6), the remaining image of the liquid crystal display device can be reduced. Accordingly, the liquid crystal display device has the characteristics of high reliability, high contrast ratio, high brightness, high voltage stability and longer life. When the polymer of the present invention is formed, the content of the compound having one of groups of formulae (1) to (6) with respect to the total amount of repeating units is between 5 mol % to 95 mol %, preferably between 10 mol % to 80 mol %, and more preferably between 40 mol % to 80 mol %.

When the polyamide acid-polyamide acid polymer represented by formula (A), the polyimide-polyamide acid polymer represented by formula (B) and the polyimide-polyimide polymer represented by formula (C) have one of groups of formulae (7) to (15), the liquid crystal alignment solution has very stable pre-tilt angle effect, thereby enabling the liquid crystal display device to have very stable alignment performance. When the polymer of the present invention is formed, the content of the compound having one of groups of formulae (7) to (15) with respect to the total amount of repeating units is between 0.1 mol % to 50 mol %, preferably between 0.1 mol % to 20 mol %, and more preferably between 0.5 mol % to 10 mol %.

Therefore, when $D^1$ is selected from one of a first group consisting of formulae (1) to (6) and a second group consisting of formulae (7) to (15), and $D^2$ is selected from the other of the first group and the second group, the liquid crystal alignment solution of the present invention helps to reduce the remaining image of the liquid crystal display device, and thus, the liquid crystal display device has the characteristics of high reliability, high contrast ratio, high brightness, high voltage stability and longer life. Further, the liquid crystal alignment solution has very stable pre-tilt angle effect, thereby enabling the liquid crystal display device to have very stable alignment performance.

Further, the imidization rate of the liquid crystal alignment solution can be 20% or higher for improving the electric characteristics of the alignment layer. In an embodiment, when the polymer of the liquid crystal alignment solution of the present invention is the polyimide-polyamide acid polymer represented by formula (B), p is larger than or equal to 0.2.

In the present invention, the method of forming the polyimide-polyamide acid polymer presented by formulae (B) includes a polymerization reaction of a tetracarboxylic acid dianhydride and a diamine in an organic solvent, and a partial ring-closing reaction is carried out by a dehydration reaction, so that a polyimide-polyamide acid product is obtained.

The tetracarboxylic acid dianhydride for synthesizing the polyimide-polyamide acid polymer presented by formulae (B) has one of the groups of formulae (1) to (6), and examples thereof are shown in Table 1 (No. 1-1 to No. 1-13). Further, the tetracarboxylic acid dianhydride having a group other than the groups of formulae (1) to (6) can be used, and examples thereof are shown in Table 2 (No. 3-1 to No. 3-43)

TABLE 1

| NO. | tetracarboxylic acid dianhydride |
|---|---|
| 1-1 |  |
| 1-2 |  |
| 1-3 |  |

TABLE 1-continued
| NO. | tetracarboxylic acid dianhydride |
|---|---|
| 1-4 | 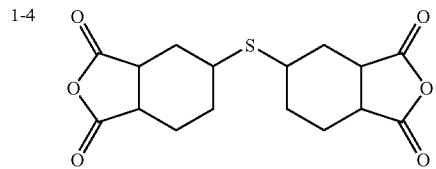 |
| 1-5 | 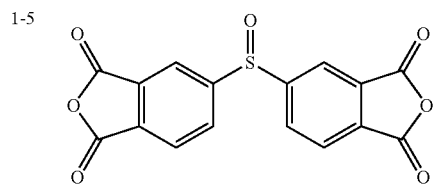 |
| 1-6 | 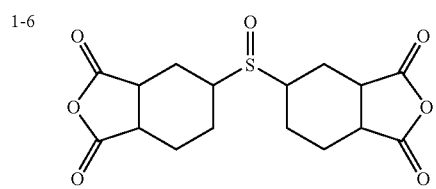 |
| 1-7 | 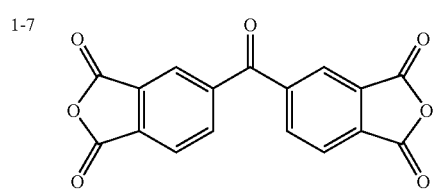 |
| 1-8 | 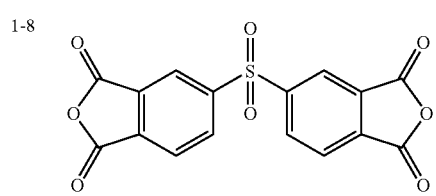 |
| 1-9 | 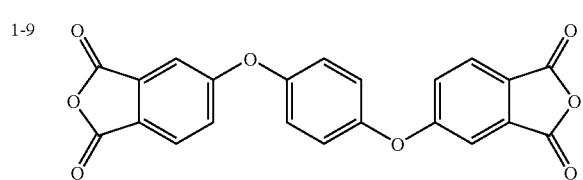 |
| 1-10 | 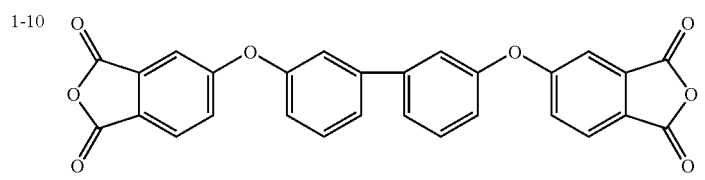 |
| 1-11 | 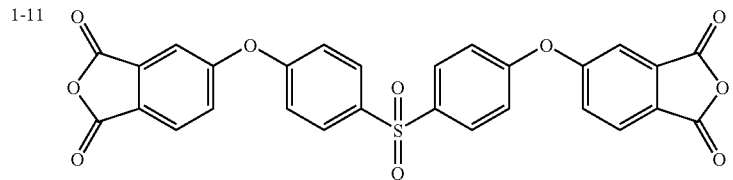 |

TABLE 1-continued

| NO. | tetracarboxylic acid dianhydride |
|---|---|
| 1-12 | |
| 1-13 | |

TABLE 2

| NO. | tetracarboxylic acid dianhydride |
|---|---|
| 3-1 | |
| 3-2 | |
| 3-3 | |
| 3-4 | |
| 3-5 | |
| 3-6 | |
| 3-7 | |
| 3-8 | |
| 3-9 | |
| 3-10 | |
| 3-11 | |
| 3-12 | |

TABLE 2-continued
| NO. | tetracarboxylic acid dianhydride |
|---|---|
| 3-13 | 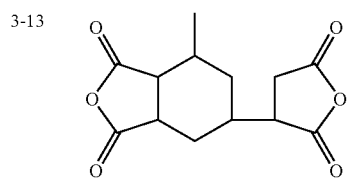 |
| 3-14 | 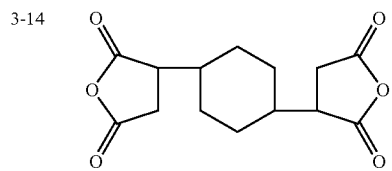 |
| 3-15 | 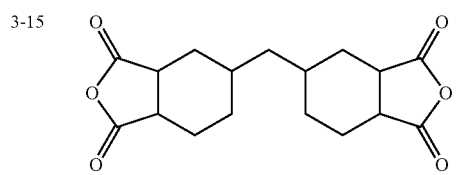 |
| 3-16 | 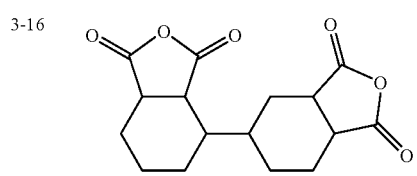 |
| 3-17 | 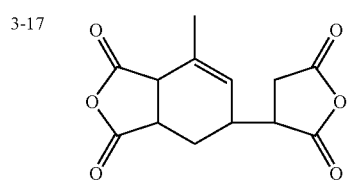 |
| 3-18 | 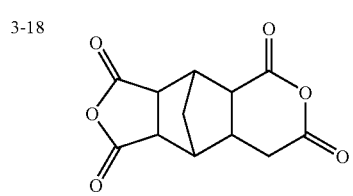 |
| 3-19 | 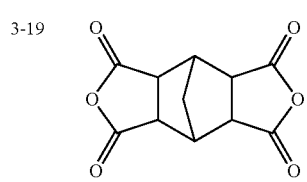 |
| 3-20 | 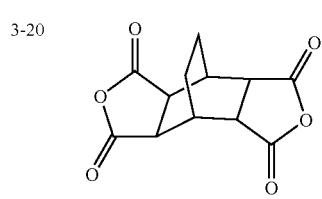 |
| 3-21 | 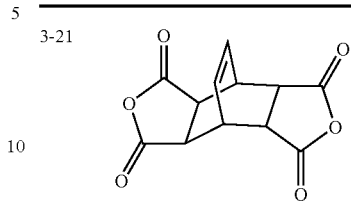 |
| 3-22 | 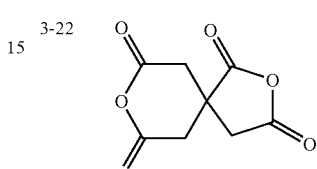 |
| 3-23 | 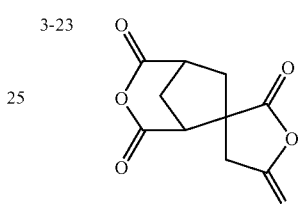 |
| 3-24 | 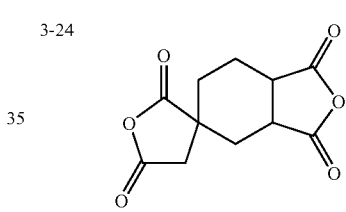 |
| 3-25 | 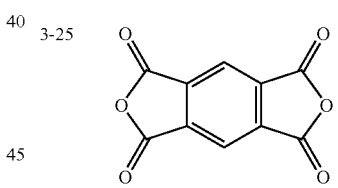 |
| 3-26 | 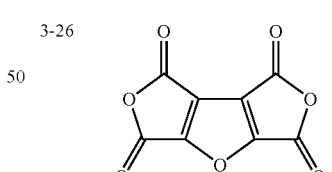 |
| 3-27 | 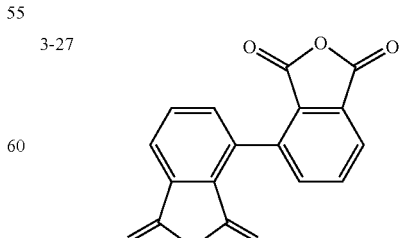 |

TABLE 2-continued
| NO. | tetracarboxylic acid dianhydride |
|---|---|
| 3-28 | 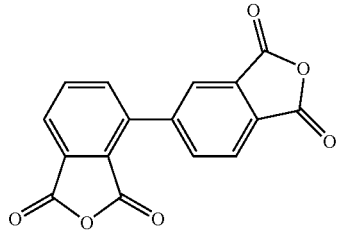 [SMILES: O=C1OC(=O)c2cc(-c3cccc4c3C(=O)OC4=O)ccc21] |
| 3-29 | 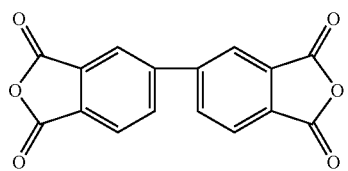 [SMILES: O=C1OC(=O)c2cc(-c3ccc4c(c3)C(=O)OC4=O)ccc21] |
| 3-30 | 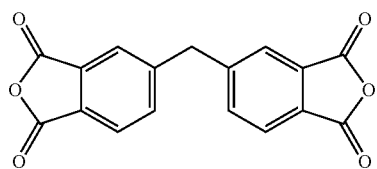 [SMILES: O=C1OC(=O)c2cc(Cc3ccc4c(c3)C(=O)OC4=O)ccc21] |
| 3-31 | 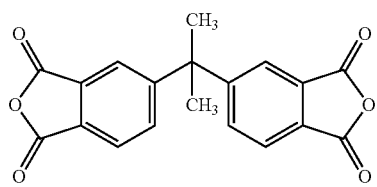 |
| 3-32 | 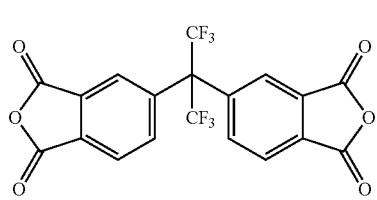 [SMILES: O=C1OC(=O)c2cc(C(c3ccc4c(c3)C(=O)OC4=O)(C(F)(F)F)C(F)(F)F)ccc21] |
| 3-33 | 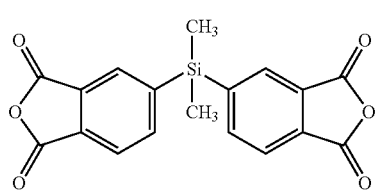 |
| 3-34 | 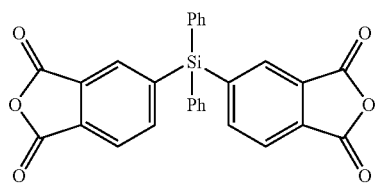 [SMILES: O=C1OC(=O)c2cc([Si](c3ccccc3)(c3ccccc3)c3ccc4c(c3)C(=O)OC4=O)ccc21] |
| 3-35 | 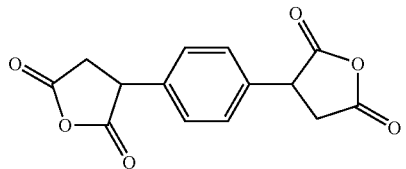 [SMILES: O=C1CC(c2ccc(C3CC(=O)OC3=O)cc2)C(=O)O1] |
| 3-36 | 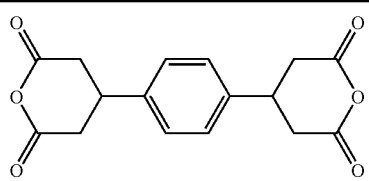 |
| 3-37 | 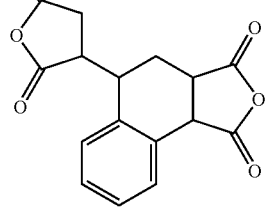 |
| 3-38 | 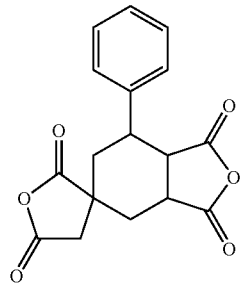 [SMILES: O=C1CC2(CC3C(=O)OC(=O)C3C(c3ccccc3)C2)C(=O)O1] |
| 3-39 | 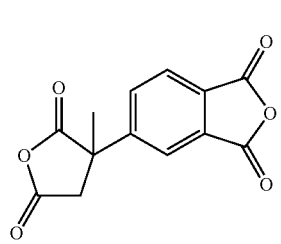 [SMILES: CC1(c2ccc3c(c2)C(=O)OC3=O)CC(=O)OC1=O] |
| 3-40 | 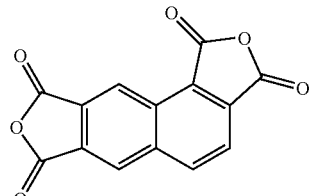 |
| 3-41 | 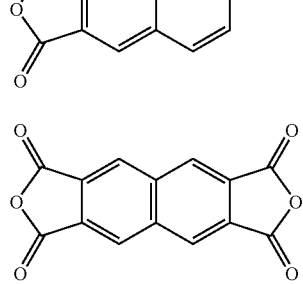 |
| 3-42 | 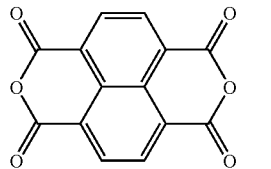 [SMILES: O=C1OC(=O)c2ccc3c4c(ccc1c24)C(=O)OC3=O] |

TABLE 2-continued

| NO. | tetracarboxylic acid dianhydride |
|-----|----------------------------------|
| 3-43 | (structure) |

Furthermore, the compounds in Tables 1 and 2 can be isomeric compounds or mixtures thereof. The tetracarboxylic acid dianhydrides as described above are intended to illustrate but not to limit the present invention. Therefore, the tetracarboxylic acid dianhydrides can be the compounds which are not mentioned herein.

Specially, in order to have a high voltage holding ratio (VHR) for a liquid crystal display device, at least one compound having an alicyclic structure is selected from the group consisting of NOs. 1-2, 1-4, 1-6, 3-2, 3-3, 3-4, 3-5, 3-6, 3-7, 3-8, 3-9, 3-11, 3-12, 3-13, 3-14, 3-15, 3-16, 3-18, 3-19, 3-20, 3-22, 3-23 and 3-24. Also, the compound selected from NOs. 1-1, 1-3, 1-5, 1-7, 1-8, 1-9, 1-10, 1-11, 1-12, 3-25, 3-27, 3-28, 3-29, 3-30, 3-40 and 3-41 may constitute with other suitable compounds properly to reduce the remaining image phenomenon.

The diamine for synthesizing the polyimide-polyamide acid polymer presented by formulae (B) has one of the groups of formulae (1) to (6), and examples thereof are shown in Table 3 (No. 1-14 to No. 1-33). Alternatively, the diamine has one of the groups of formulae (7) to (15), and examples thereof are shown in Table 4 (No. 2-1 to No. 2-86). In addition, the diamine having a group other than the groups of formulae (1) to (15) can be used, and examples thereof are shown in Table 5 (No. 4-1 to No. 4-77).

TABLE 3

| NO. | diamine |
|-----|---------|
| 1-14 | (structure) |
| 1-15 | (structure) |
| 1-16 | (structure) |
| 1-17 | (structure) |
| 1-18 | (structure) |
| 1-19 | (structure) |
| 1-20 | (structure) |
| 1-21 | (structure) |
| 1-22 | (structure) |

TABLE 3-continued
| NO. | diamine |
|---|---|
| 1-23 | 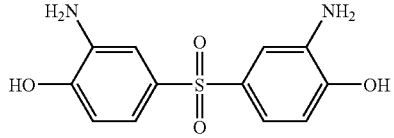 |
| 1-24 | 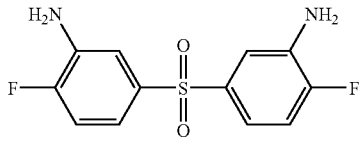 [SMILES: Nc1cc(S(=O)(=O)c2ccc(F)c(N)c2)ccc1F] |
| 1-25 | 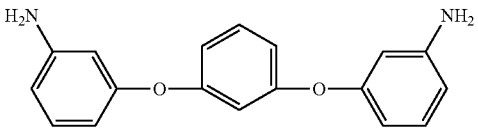 [SMILES: Nc1cccc(Oc2cccc(Oc3cccc(N)c3)c2)c1] |
| 1-26 | 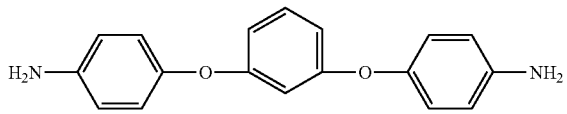 [SMILES: Nc1ccc(Oc2cccc(Oc3ccc(N)cc3)c2)cc1] |
| 1-27 | 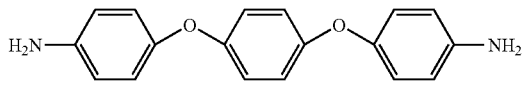 [SMILES: Nc1ccc(Oc2ccc(Oc3ccc(N)cc3)cc2)cc1] |
| 1-28 | 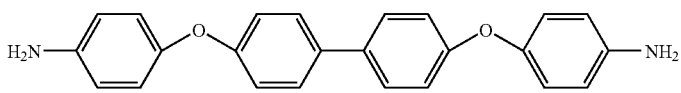 [SMILES: Nc1ccc(Oc2ccc(-c3ccc(Oc4ccc(N)cc4)cc3)cc2)cc1] |
| 1-29 | 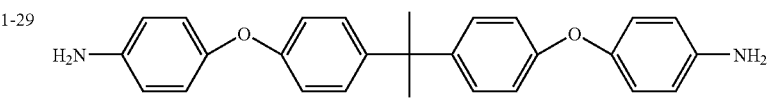 |
| 1-30 | 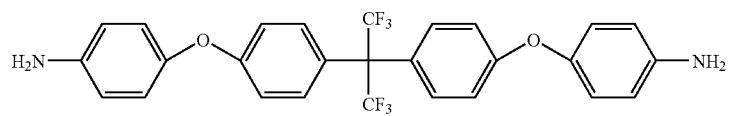 |
| 1-31 | 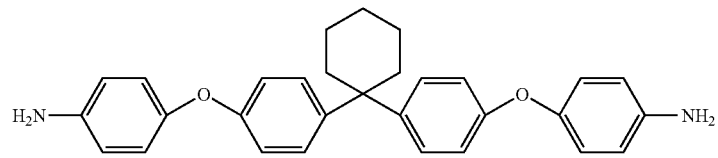 [SMILES: Nc1ccc(Oc2ccc(C3(c4ccc(Oc5ccc(N)cc5)cc4)CCCCC3)cc2)cc1] |
| 1-32 | 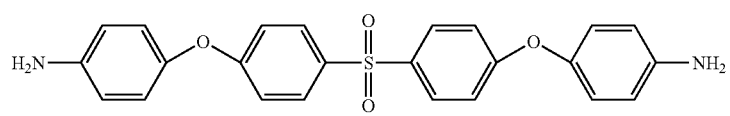 |
| 1-33 | 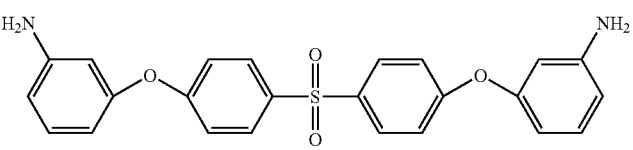 [SMILES: Nc1cccc(Oc2ccc(S(=O)(=O)c3ccc(Oc4cccc(N)c4)cc3)cc2)c1] |

TABLE 4
| NO. | diamine |
|---|---|
| 2-1 | 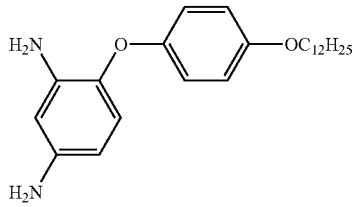 |
| 2-2 | 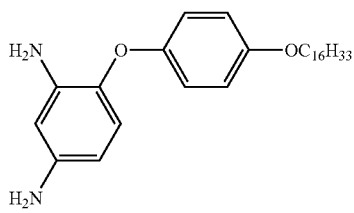 |
| 2-3 | 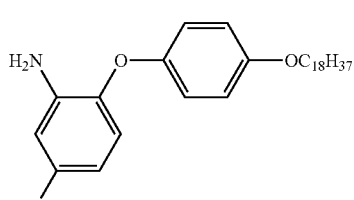 |
| 2-4 | 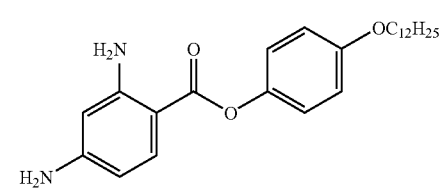 |
| 2-5 | 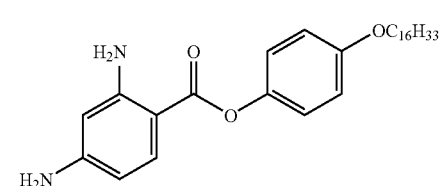 |
| 2-6 | 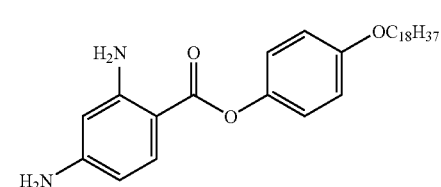 |
| 2-7 | 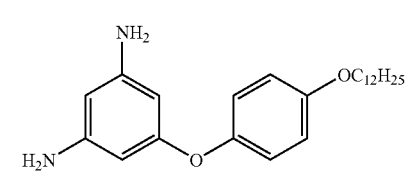 |
| 2-8 | 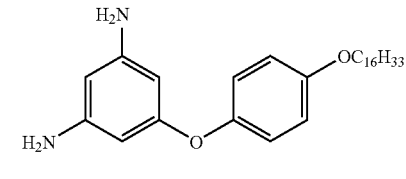 |

TABLE 4-continued
| NO. | diamine |
|---|---|
| 2-9 | 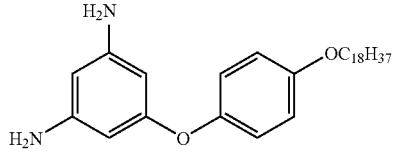 |
| 2-10 | 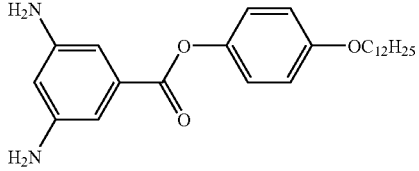 |
| 2-11 | 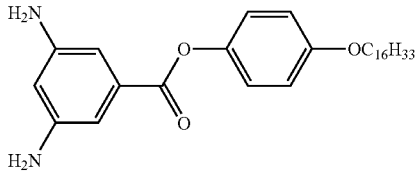 |
| 2-12 | 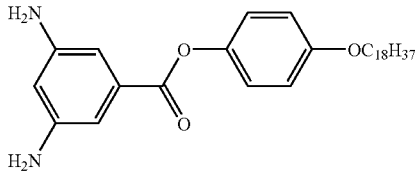 |
| 2-13 | 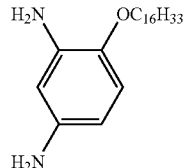 |
| 2-14 | 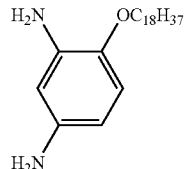 |
| 2-15 | 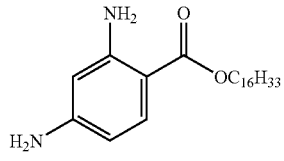 |
| 2-16 | 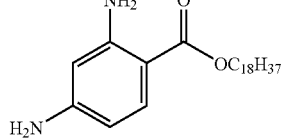 |

TABLE 4-continued
| NO. | diamine |
|---|---|
| 2-17 | 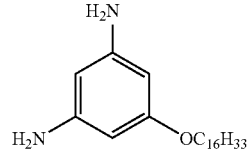 |
| 2-18 | 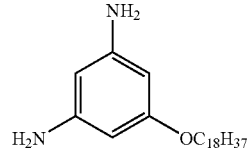 |
| 2-19 | 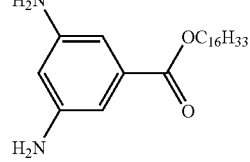 |
| 2-20 | 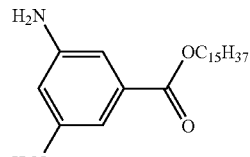 |
| 2-21 | 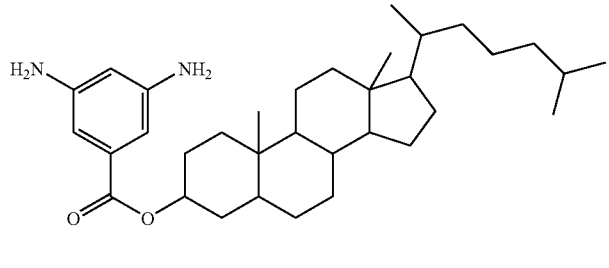 [SMILES: CC(C)CCCC(C)C1CCC2C3CCC4CC(OC(=O)c5cc(N)cc(N)c5)CCC4(C)C3CCC12C] |
| 2-22 | 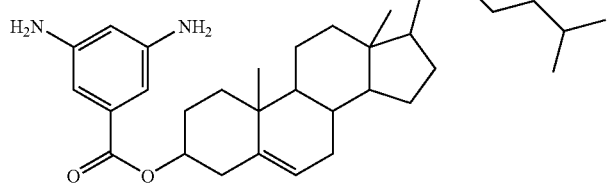 |
| 2-23 | 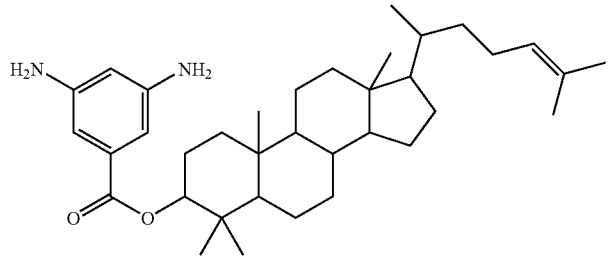 [SMILES: CC(C)=CCCC(C)C1CCC2C3CCC4C(C)(C)C(OC(=O)c5cc(N)cc(N)c5)CCC4(C)C3CCC12C] |

TABLE 4-continued

| NO. | diamine |
|---|---|
| 2-24 | |
| 2-25 | |
| 2-26 | |
| 2-27 | |
| 2-28 | |

TABLE 4-continued

| NO. | diamine |
| --- | --- |
| 2-29 | (structure) |
| 2-30 | (structure) |
| 2-31 | (structure) |
| 2-32 | (structure) |

TABLE 4-continued
| NO. | diamine |
|---|---|
| 2-33 | 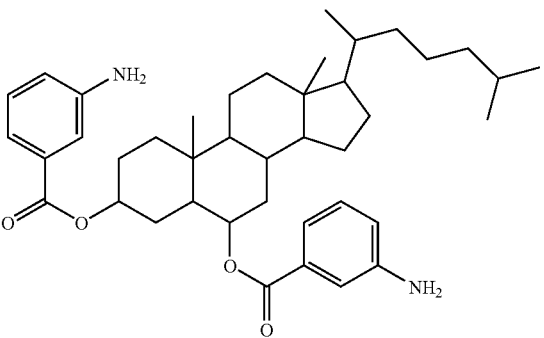 [SMILES: CC(C)CCCC(C)C1CCC2C3CC(OC(=O)c4cccc(N)c4)C4CC(OC(=O)c5cccc(N)c5)CCC4(C)C3CCC12C] |
| 2-34 | 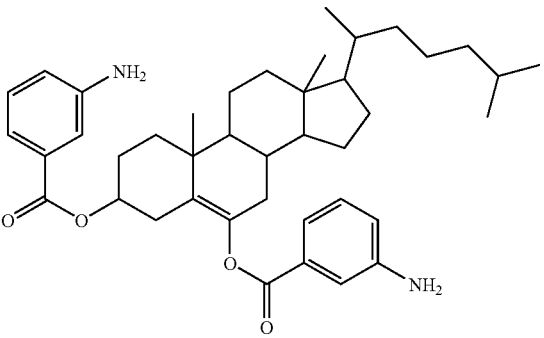 [SMILES: CC(C)CCCC(C)C1CCC2C3CC(OC(=O)c4cccc(N)c4)=C4CC(OC(=O)c5cccc(N)c5)CCC4(C)C3CCC12C] |
| 2-35 | 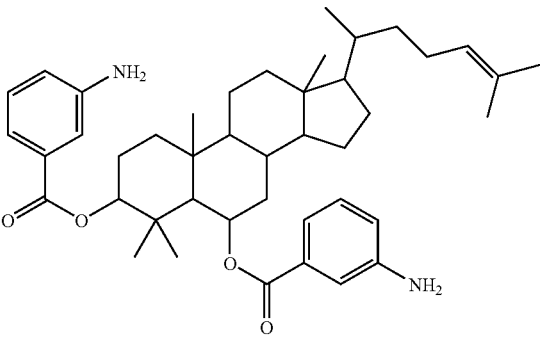 [SMILES: CC(C)=CCCC(C)C1CCC2C3CC(OC(=O)c4cccc(N)c4)C4C(C)(C)C(OC(=O)c5cccc(N)c5)CCC4(C)C3CCC12C] |
| 2-36 | 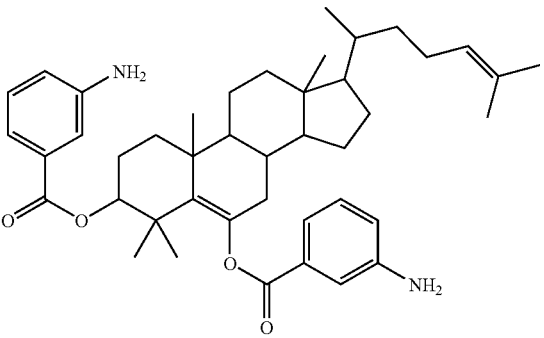 [SMILES: CC(C)=CCCC(C)C1CCC2C3CC(OC(=O)c4cccc(N)c4)=C4C(C)(C)C(OC(=O)c5cccc(N)c5)CCC4(C)C3CCC12C] |
| 2-37 | 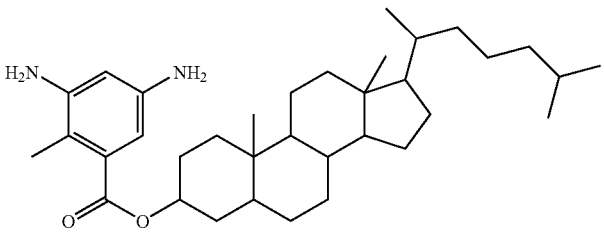 [SMILES: Cc1c(N)cc(N)cc1C(=O)OC1CCC2(C)C(CCC3C2CCC2(C)C(C(C)CCCC(C)C)CCC32)C1] |

TABLE 4-continued

| NO. | diamine |
|---|---|
| 2-38 | |
| 2-39 | |
| 2-40 | |
| 2-41 | |
| 2-42 | |
| 2-43 | |

TABLE 4-continued

| NO. | diamine |
|---|---|
| 2-44 | |
| 2-45 | |
| 2-46 | |
| 2-47 | |
| 2-48 | |
| 2-49 | |

TABLE 4-continued
| NO. | diamine |
|---|---|
| 2-50 | 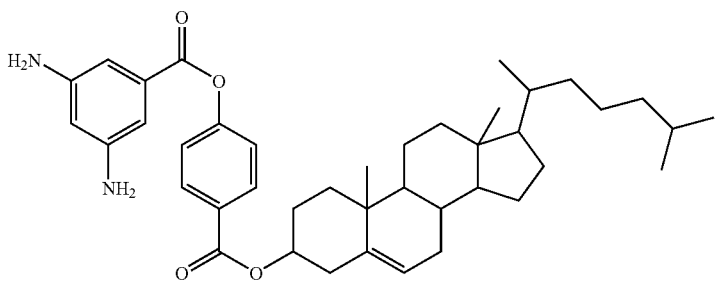 [SMILES: CC(C)CCCC(C)C1CCC2C3CC=C4CC(OC(=O)c5ccc(OC(=O)c6cc(N)cc(N)c6)cc5)CCC4(C)C3CCC12C] |
| 2-51 | 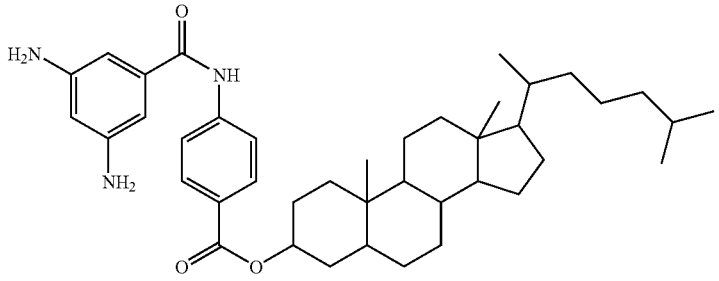 [SMILES: CC(C)CCCC(C)C1CCC2C3CCC4CC(OC(=O)c5ccc(NC(=O)c6cc(N)cc(N)c6)cc5)CCC4(C)C3CCC12C] |
| 2-52 | 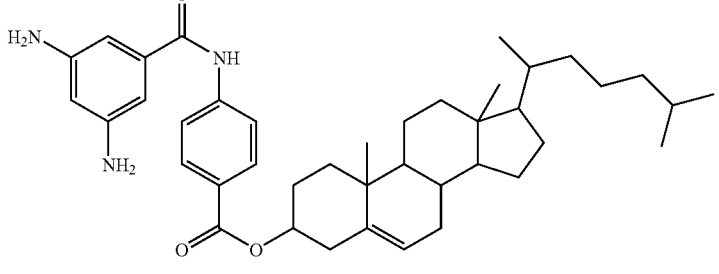 |
| 2-53 | 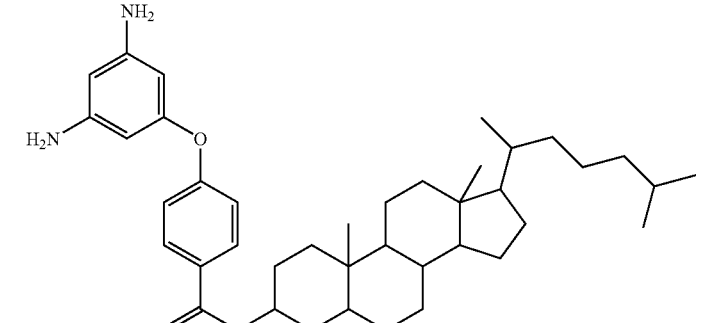 |
| 2-54 | 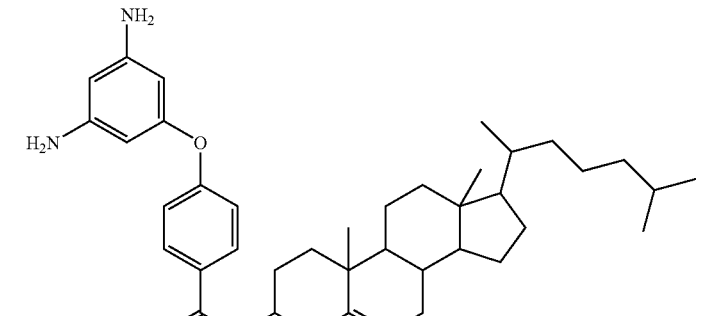 |

TABLE 4-continued

| NO. | diamine |
|---|---|
| 2-55 | |
| 2-56 | |
| 2-57 | |
| 2-58 | |
| 2-59 | |

TABLE 4-continued

| NO. | diamine |
|---|---|
| 2-60 | |
| 2-61 | |
| 2-62 | |
| 2-63 | |
| 2-64 | |
| 2-65 | |

TABLE 4-continued
| NO. | diamine |
|---|---|
| 2-66 | 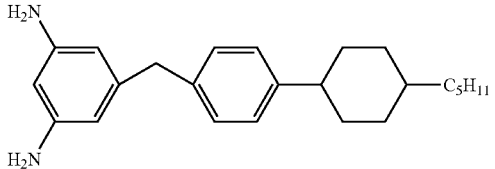 |
| 2-67 | 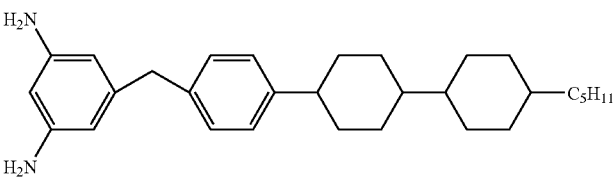 |
| 2-68 | 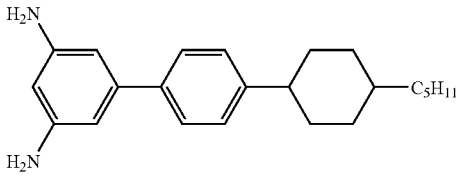 |
| 2-69 | 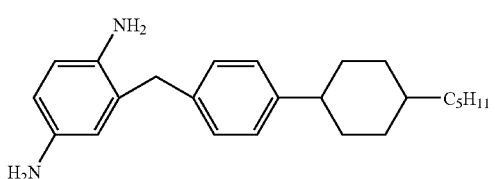 |
| 2-70 | 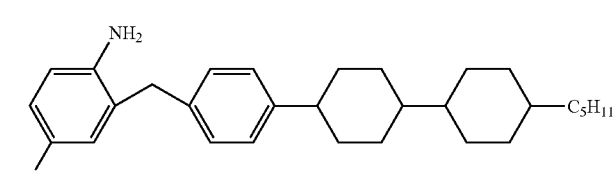 |
| 2-71 | 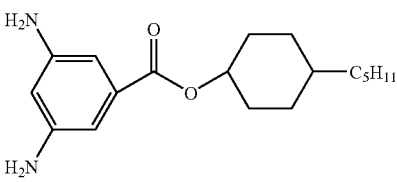 |
| 2-72 | 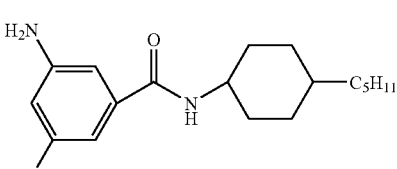 |
| 2-73 | 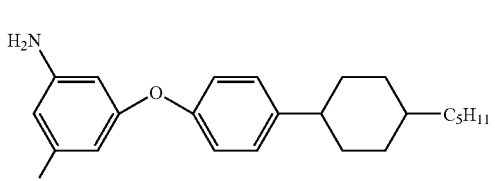 |

TABLE 4-continued
| NO. | diamine |
|---|---|
| 2-74 | 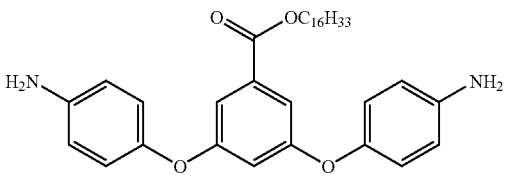 |
| 2-75 | 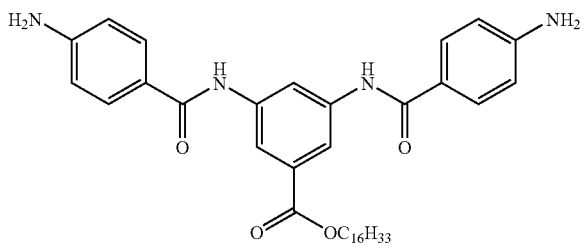 |
| 2-76 | 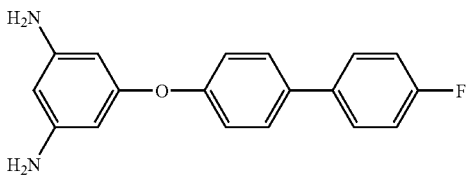 [SMILES: Nc1cc(N)cc(Oc2ccc(-c3ccc(F)cc3)cc2)c1] |
| 2-77 | 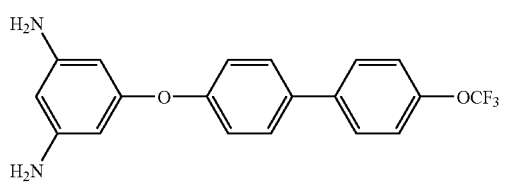 [SMILES: Nc1cc(N)cc(Oc2ccc(-c3ccc(OC(F)(F)F)cc3)cc2)c1] |
| 2-78 | 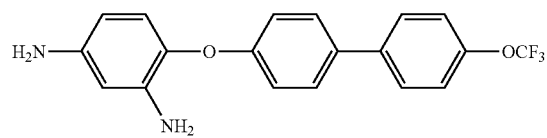 [SMILES: Nc1ccc(Oc2ccc(-c3ccc(OC(F)(F)F)cc3)cc2)c(N)c1] |
| 2-79 | 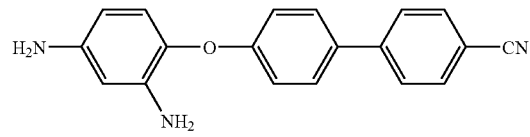 |
| 2-80 | 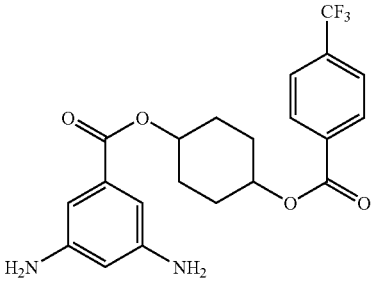 [SMILES: Nc1cc(N)cc(C(=O)OC2CCC(OC(=O)c3ccc(C(F)(F)F)cc3)CC2)c1] |

TABLE 4-continued

| NO. | diamine |
|---|---|
| 2-81 | 3,5-diaminophenyl ester of 4-(4-fluorobenzoyloxy)cyclohexyl benzoate |
| 2-82 | 3,5-diamino-1-[3-(4-biphenylyloxy)propoxy]benzene |
| 2-83 | 3,5-diamino-1-{3-[(4'-cyano-4-biphenylyl)oxy]propoxy}benzene |
| 2-84 | 3,5-diamino-1-{3-[(4'-fluoro-4-biphenylyl)oxy]propoxy}benzene |
| 2-85 | 3,5-diamino-1-{3-[(4'-trifluoromethoxy-4-biphenylyl)oxy]propoxy}benzene |
| 2-86 | 3,5-diaminobenzoic acid 4'-pentyl-bicyclohexyl-4-yl ester |

TABLE 5

| NO. | diamine | NO. | diamine |
|---|---|---|---|
| 4-1 | H$_2$N-(CH$_2$)$_3$-NH$_2$ | 4-5 | H$_2$N-(CH$_2$)$_7$-NH$_2$ |
| 4-2 | H$_2$N-(CH$_2$)$_4$-NH$_2$ | 4-6 | H$_2$N-(CH$_2$)$_8$-NH$_2$ |
| 4-3 | H$_2$N-(CH$_2$)$_5$-NH$_2$ | 4-7 | H$_2$N-(CH$_2$)$_9$-NH$_2$ |
| 4-4 | H$_2$N-(CH$_2$)$_6$-NH$_2$ | 4-8 | H$_2$N-(CH$_2$)$_{10}$-NH$_2$ |

TABLE 5-continued

| NO. | diamine |
|---|---|
| 4-9 | H₂N-(CH₂)₈-NH₂ |
| 4-10 | H₂N-(CH₂)₁₀-NH₂ |
| 4-11 | 1,3-bis(aminomethyl)cyclohexane |
| 4-12 | 1,4-bis(aminomethyl)cyclohexane |
| 4-13 | 1,4-diaminocyclohexane |
| 4-14 | bis(4-aminocyclohexyl)methane |
| 4-15 | 1,4-phenylenediamine |
| 4-16 | 1,3-phenylenediamine |
| 4-17 | 2-methyl-1,4-phenylenediamine |
| 4-18 | 4-methyl-1,3-phenylenediamine |
| 4-19 | 2,6-diaminopyridine |
| 4-20 | 2,4-diaminopyrimidine |
| 4-21 | 3,4-diaminothiophene |
| 4-22 | 1,5-diaminonaphthalene |
| 4-23 | 4,4'-diaminobiphenyl |
| 4-24 | 2,2'-dimethyl-4,4'-diaminobiphenyl |
| 4-25 | 3,3'-dimethyl-4,4'-diaminobiphenyl |
| 4-26 | 3,3'-diethyl-4,4'-diaminobiphenyl |
| 4-27 | 3,3'-bis(trifluoromethyl)-4,4'-diaminobiphenyl |
| 4-28 | 2,2'-bis(trifluoromethyl)-4,4'-diaminobiphenyl |
| 4-29 | 4,4'-diamino-2,2'-biphenyldisulfonic acid |
| 4-30 | 3,3'-dimethoxy-4,4'-diaminobiphenyl |
| 4-31 | 3,3'-dichloro-4,4'-diaminobiphenyl |
| 4-32 | 3,3'-dihydroxy-4,4'-diaminobiphenyl |

TABLE 5-continued
| NO. | diamine |
|---|---|
| 4-33 | 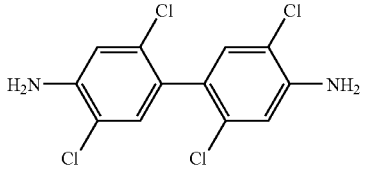 [SMILES: Nc1cc(Cl)c(-c2cc(Cl)c(N)cc2Cl)cc1Cl] |
| 4-34 | 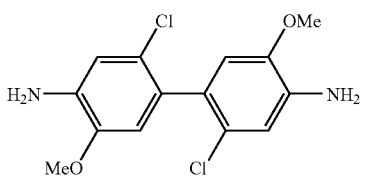 [SMILES: COc1cc(-c2cc(OC)c(N)cc2Cl)c(Cl)cc1N] |
| 4-35 | 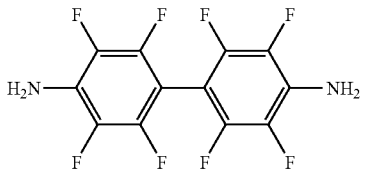 [SMILES: Nc1c(F)c(F)c(-c2c(F)c(F)c(N)c(F)c2F)c(F)c1F] |
| 4-36 | 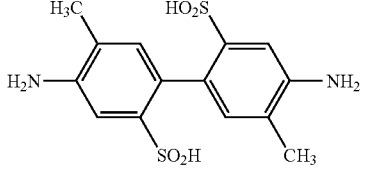 |
| 4-37 | 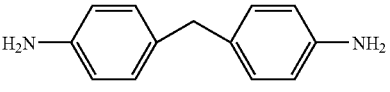 [SMILES: Nc1ccc(Cc2ccc(N)cc2)cc1] |
| 4-38 | 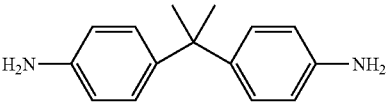 |
| 4-39 | 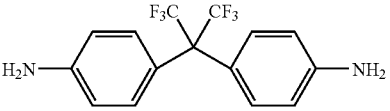 |
| 4-40 | 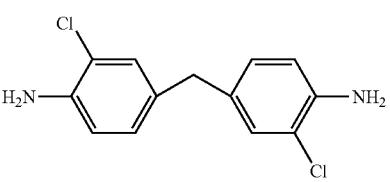 [SMILES: Nc1ccc(Cc2ccc(N)c(Cl)c2)cc1Cl] |
| 4-41 | 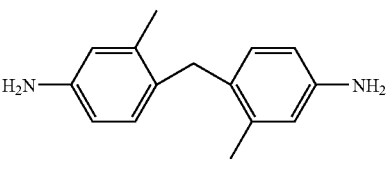 [SMILES: Cc1cc(N)ccc1Cc1ccc(N)cc1C] |
| 4-42 | 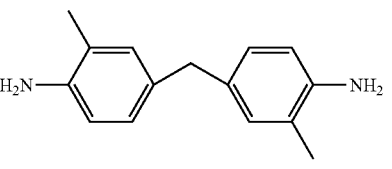 [SMILES: Cc1cc(Cc2ccc(N)c(C)c2)ccc1N] |
| 4-43 | 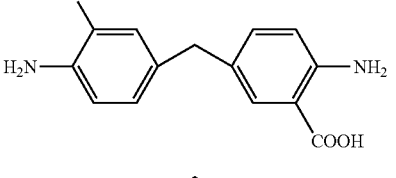 |
| 4-44 | 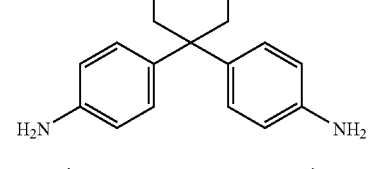 |
| 4-45 | 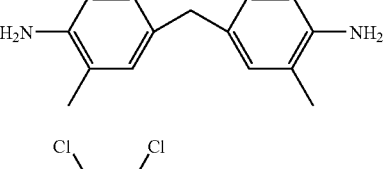 |
| 4-46 | 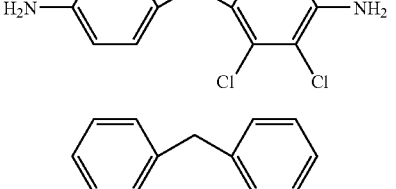 |
| 4-47 | 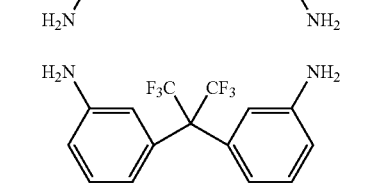 |
| 4-48 | 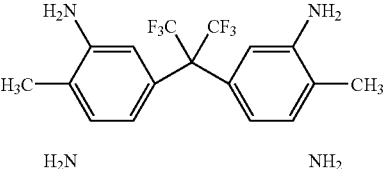 |
| 4-49 | 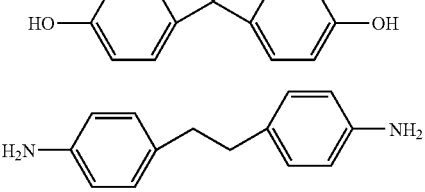 |
| 4-50 |  |
| 4-51 |  |

TABLE 5-continued
| NO. | diamine |
|---|---|
| 4-52 | 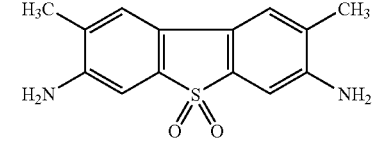 [SMILES: Cc1cc2c(cc1N)S(=O)(=O)c1cc(N)c(C)cc1-2] |
| 4-53 | |
| 4-54 | |
| 4-55 | |
| 4-56 | |
| 4-57 | |
| 4-58 | |
| 4-59 | |
| 4-60 | |
| 4-61 | |
| 4-62 | |
| 4-63 | |
| 4-64 | |
| 4-65 | |
| 4-66 | |
| 4-67 | |
| 4-68 | |

TABLE 5-continued

| NO. | diamine |
|---|---|
| 4-69 | (pyrene with two NH₂ groups) |
| 4-70 | (pyrene with two NH₂ groups) |
| 4-71 | (pyrene with two NH₂ groups) |
| 4-72 | (binaphthyl with two methyl and two NH₂ groups) |
| 4-73 | (bis-pyrimidine disulfide with CH₃, NH₂ groups) |
| 4-74 | (2,5-bis(4-aminophenyl)-1,3,4-oxadiazole) |
| 4-75 | H₂N–C₆H₄–C(CH₃)₂–C₆H₄–C(CH₃)₂–C₆H₄–NH₂ |
| 4-76 | H₂N–C₆H₄–O–CH₂–C(CH₃)₂–CH₂–O–C₆H₄–NH₂ |
| 4-77 | H₂N–C₆H₄–O–(CH₂)₄–O–C₆H₄–NH₂ |

Furthermore, the compounds in Tables 3, 4 and 5 can be isomeric compounds or mixtures thereof. The diamines as described above are intended to illustrate but not to limit the present invention. Therefore, the diamines can be the compounds which are not mentioned herein.

It is noted that the pre-tilt angle of liquid crystal molecules can be adjusted by changing the side chain length of the polyimide-polyamide acid polymer, and mostly, by changing the side chain length of the diamine. The appropriate pre-tilt angle can be provided by selecting at least one of the diamines shown in No. 2-1 to No. 2-86.

The synthesis method of a polyimide-polyamide acid is described in the following.

The ratio of a tetracarboxylic acid dianhydride to a diamine for synthesizing a polyimide-polyamide acid is described below. When an anhydride group of the tetracarboxylic acid dianhydride is 1 equivalent, an amino group of the diamine is preferably 0.5-2 equivalents and more preferably 0.7-1.5 equivalents.

The synthesis reaction of the polyimide-polyamide acid is carried out in an organic solvent. The dissolubility of the polyimide-polyamide acid is better in some of the organic solvents than the others of the organic solvents. Examples of the organic solvents having better dissolubility to the polyimide-polyamide acid include N-methyl-2-pyrrolidone, N,N-dimethylformamide, N,N-dimethyl acetamide, N-methylcaprolactam, dimethyl sulfoxide, tetramethyl urea, hexamethyl phosphoramide, γ-butyrolactone and pyridine, etc., and two or more of the above-mentioned solvents can be mixed when used.

The organic solvents having worse dissolubility to the polyimide-polyamide acid can be mixed with the above-mentioned organic solvents as long as the polyimide-polyamide acid is not precipitated from the mixed organic solvents. Examples of the organic solvents having worse dissolubility to the polyimide-polyamide acid include methanol, ethanol, isopropyl alcohol, 1-butanol, cyclohexanol, ethylene glycol, ethylene glycol methyl ether, ethylene glycol monoethyl ether, ethylene glycol monobutyl ether, ethylene glycol dimethyl ether, ethylene glycol diethyl ether, diethyl ether, acetone, methyl ethyl ketone, cyclohexanone, methyl acetate, ethyl acetate, tetrahydrofuran, di chloromethane, trichloromethane, 1,2-dichloroethane, benzene, methylbenzene, dimethylbenzene, n-hexane, n-heptane and n-octane, etc.

A dehydration ring-closing reaction is required to form the polyimide-polyamide acid. The dehydration ring-closing reaction can be performed by directly heating or adding a dehydration agent and a catalyst.

(1) Directly Heating:

The reaction temperature is between 50 and 300 degrees centigrade and preferably between 100 and 250 degrees centigrade, for example. The dehydration ring-closing reaction can not occur when the reaction temperature is below 50 degrees centigrade.

(2) Adding a Dehydration Agent and a Catalyst:

The reaction temperature is between −20 and 150 degrees centigrade and preferably between 0 and 120 degrees centigrade, for example. The dehydration agent is an anhydride such as acetic anhydride, propionic anhydride or trifluoroacetic anhydride, for example. The amount of the dehydration agent depends on the required ring-closing ratio. 0.01-20 moles of the dehydration agent are preferably used for every mole of repeating unit of the polyimide-polyamide acid. The catalyst is a tertiary amine such as triethylamine, pyridine or dimethylpiridine, for example. 0.01-10 moles of the catalyst are preferably used for every mole of the dehydration agent.

The purification method of the polyimide-polyamide acid includes pouring a lot of solvent having worse dissolubility into the reaction solvent of the polyimide-polyamide acid, so as to obtain a precipitation. Thereafter, a drying process is preformed under reduced pressure to obtain a crude polyimide-polyamide acid. Thereafter, the crude polyimide-polyamide acid is dissolved in an organic solvent and then precipitated by using another solvent having worse dissolubility. The above process steps can be performed once or multiple times so as to purify the polyimide-polyamide acid. Then, the polyimide-polyamide acid is dissolved in a solvent having better dissolubility.

The viscosity ($\eta_{ln}$) of the liquid crystal alignment solution can be obtained from formula (I):

$$\eta_{ln} = \frac{\ln(\text{Flow time of solution/Flow time of solvent})}{\text{Weight concentration of polymer}} \quad (1)$$

In the present invention, the solids content of the liquid crystal alignment solution is preferably between 1 and 10 wt % in terms is of the viscosity and volatility.

The liquid crystal alignment solution in accordance with the present invention is coated on a substrate to form a liquid crystal alignment layer. When the solids content of the liquid crystal alignment solution is below 1 wt %, the thickness of the liquid crystal alignment layer is too thin so that the orientation of liquid crystal molecules is affected; when the solids content of the liquid crystal alignment solution is more than 10 wt %, the coating quality is deteriorated.

In addition, the fabrication temperature of the liquid crystal alignment solution is preferably between 0 and 150 degrees centigrade, and more preferably between 25 and 50 degrees centigrade.

In this invention, examples of the organic solvent of the liquid crystal alignment solution include N-methyl-2-pyrrolidone, N,N-dimethylformamide, N,N-dimethyl acetamide, N-Methylcaprolactam, dimethyl sulfoxide, γ-butyrolactone, γ-butyrolactam, ethylene glycol monomethyl ether, ethylene glycol monoethyl ether, ethylene glycol n-propyl ether and ethylene glycol monobutyl ether, etc., and two or more of the above-mentioned solvents can be mixed when used.

The liquid crystal alignment solution in accordance with the present invention may further include an organic siloxane compound such as aminopropyl-trimethoxy-silane, aminoproply-triethoxy-silane, vinyl-methyl-silane, N-(2-aminoethyl)-3-aminopropyl-methyl-dimethoxy-silane, N-(2-aminoethyl)-3-aminopropyl-trimethoxy-silane, vinyl-triethoxy-silane, 3-methacryloxy-propyl-trimethoxy-silane, 3-epoxypropoxy-propyl-trimethoxy-silane, 3-epoxypropoxy-propyl-methyl-dimethoxy-silane, 2-(3,4-epoxycyclohexyl)-ethyl-trimethoxy-silane, 3-ureido-propyl-trimethoxy-silane, 3-ureido-propyl-triethoxy-silane, N-ethoxycarbonyl-3-aminopropyl-trimethoxysilane, N-ethoxycarbonyl-3-aminopropyl-triethoxysilane, N-triethoxysilylpropyl-triethylene-triamine, N-trimethoxysilylpropyl-triethylene-triamine, N-bis(oxyethylene)-3-aminopropyl-trimethoxy-silane, N-bis(oxyethylene)-3-aminopropyl-triethyl-silane, etc. The above-mentioned organic siloxane compounds can improve the adhesion between the liquid crystal alignment layer and the substrate under the condition that the amount of the organic siloxane compounds does not impact the required characteristics of the liquid crystal alignment layer. If the amount of organic siloxane compounds in the liquid crystal alignment solution is too much, the orientation performance of the liquid crystal alignment layer is reduced; if the amount of the organic siloxane compounds in the liquid crystal alignment solution is not enough, the rubbing mura and particles occur in the liquid crystal alignment layer. Therefore, the concentration of the organic siloxane compounds in the liquid crystal alignment solution with respect to the polymer weight of the liquid crystal alignment solution is preferably from 0.01 to 5 wt % and more preferably from 0.1 to 3 wt %.

Furthermore, the liquid crystal alignment solution in accordance with the present invention may also include an epoxy compound such as ethylene glycol diglycidyl ether, propylene glycol diglycidyl ether, tripropylene glycol diglycidyl ether, neopentyl glycol diglycidyl ether, 1,6-hexanediol diglycidyl ether, glycerine diglycidyl ether, 2,2-dibromoneopentyl glycol diglycidyl ether, 1,3,5,6-tetraglycidyl-2,4-hexanediol, N,N,N',N'-tetraglycidyl-meta-xylene, 1,3-bis(N,N-diglycidylaminomethyl)cyclohexane, N,N,N',N'-tetraglycidyl-4,4'-diaminodiphenylmethane, 3-(N-propenyl-N-glycidyl)aminopropyl-trimethoxysilane, 3-(N,N-diglycidyl)aminobutyl-trimethoxysilane. The above-mentioned epoxy compounds can improve the adhesion between the liquid crystal alignment layer and the substrate under the condition that the amount of the epoxy compounds does not impact the required characteristics of the liquid crystal alignment layer. If the amount of the epoxy compounds in the liquid crystal alignment solution is too much, the orientation performance of the liquid crystal alignment layer is reduced; if the amount of the epoxy compounds in the liquid crystal alignment solution is not enough, the rubbing mura and particles occur in the liquid crystal alignment layer. Therefore, the concentration of the epoxy compounds in the liquid crystal alignment solution with respect to the total weight of the liquid crystal alignment solution is preferably between 0.01 and 3 wt % and more preferably between 0.1 and 2 wt %.

The fabrication method of a liquid crystal display is described in the following.

(1) The liquid crystal alignment solution in accordance with the present invention is applied to a glass substrate by roll coating, spin coating or print coating. The glass substrate has a patterned transparent conductive film. A baking process is performed after the glass substrate is coated with the liquid crystal alignment solution, so that the organic solvent of the liquid crystal alignment solution is removed and the dehydration ring-closing reaction is performed on the acyclic polyamide acid to form a polyimide film. The baking temperature is between 80 and 300 degrees centigrade and preferably between 100 and 240 degrees centigrade, for example. The film thickness is preferably between 0.005 and 0.5 um.

(2) A rubbing process is performed, in a fixed direction, on the film by a roll wired with a cloth such as nylon or cotton, so that liquid crystal molecules will be oriented in the direction of rubbing. Thus, the substrate having the liquid crystal alignment layer is formed.

(3) A frame is coated on the substrate having the liquid crystal alignment layer, spacers are sprayed on another substrate having the liquid crystal alignment layer, and the above-mentioned two substrates are then formed together with the way that the rubbing directions are perpendicular with or parallel to each other. Thereafter, liquid crystal molecules are injected into the gap between two substrates and the injection hole is then sealed so as to form a liquid crystal display panel.

The following characteristics are generally used to evaluate a liquid crystal display device:

(1) Pre-Tilt Angle

A pre-tilt angle is measured by performing a crystal rotation method on the liquid crystal display panel which has been injected with liquid crystal molecules.

(2) Rubbing Property

A liquid crystal alignment solution is spin coated on an indium tin oxide (ITO) substrate. A baking process is then performed in an oven. Thereafter, a rubbing process is performed, in a fixed direction, 10 times under the conditions that the rotation speed is 1000 spins/min and the platform moving speed is 60 ms/sec. Afterwards, the rubbed surface is observed under a polarizing microscope.

(3) Voltage Holding Ratio (VHR)

Under an environmental temperature of 60 degrees centigrade, a DC voltage of 3V is applied to a liquid crystal display device in a pulse width of 60 μsec and a frequency of 60 Hz to measure the voltage holding ratio of the liquid crystal display device.

(4) Residual Direct Current (RDC)

Under an environmental temperature of 60 degrees centigrade, a DC voltage of 5V is applied to a liquid crystal display device for one hour, and then the DC voltage is interrupted to measure the residual DC voltage of the liquid crystal display device.

(5) Imidization Rate

A drying process is performed on a polymer or a liquid crystal alignment solution under reduced pressure at room temperature. The dried solids are dissolved in deuterated dimethyl sulfoxide. The imidization rate is obtained, using tetramethyl silane as the internal standard, with $^1$H-NMR (proton NMR) based on formula (II), $$\text{Imidization rate (\%)} = (1 - A^1/A^2 \times \alpha) \times 100 \quad \text{(II)}$$

in which $A^1$ is an integration area of the peak at 10 ppm caused by protons of NH groups; $A^2$ is an integration area of the peak of the other protons; and $\alpha$ is a number ratio of the other protons to protons of NH groups in the polymer precursor (polyamide acid).

(6) Adhesion

A liquid crystal alignment solution is coated on an ITO substrate and the ITO substrate is then water boiled at 100 degrees centigrade for one hour. Thereafter, a cross cut method is performed with a 3M tape.

(7) Reliability

In a hot and humid environment (temperature is 50 degrees centigrade and the relative humidity is 90%), a voltage of 5V in a frequency of 60 Hz is applied to a liquid crystal display device for 500 hours. Thereafter, the liquid crystal display device is observed under a polarizing microscope.

The synthesis methods of synthesis examples (polymers A1-A146 and B1-B79) and control examples (polymers a1, b1 and b2) are described in the following.

A tetracarboxylic acid dianhydride and a diamine were subsequently added to N-Methyl-2-pyrrolidone (ratios are shown in Tables 6 and 7) to form a solution with solids content of 25 wt %. The solution was reacted at 50-60 degrees centigrade for 4-5 hours and a polyamide acid was then obtained. Pyridine and acetic anhydride (the amount of the pyridine and acetic anhydride depended on the imidization rate) were added to the polyamide acid, and a dehydration ring-closing reaction was carried out at 100-110 degrees centigrade for 3-4 hours. The obtained solution was precipitated and purified by methanol. Thereafter, a drying process was performed under reduced pressure to obtain the polymers A1-A146, B1-B79, a1, b1 and b2 with intrinsic viscosities and imidization rates as shown in Tables 6 and 7.

TABLE 6

| | diamine (mmole) | tetracarboxylic acid dianhydride (mmole) | imidization rate (%) | intrinsic viscosity (dl/g) | polymer |
|---|---|---|---|---|---|
| synthesis example | | | | | |
| 1 | 2-1(25), 4-15(75) | 3-17(100) | 99.5 | 0.3 | A1 |
| 2 | 2-1(30), 4-15(70) | 3-17(100) | 99 | 0.25 | A2 |
| 3 | 2-1(35), 4-15(65) | 3-17(100) | 100 | 0.2 | A3 |
| 4 | 2-1(25), 4-15(75) | 3-21(100) | 99.5 | 0.35 | A4 |
| 5 | 2-1(30), 4-15(70) | 3-21(100) | 99 | 0.3 | A5 |
| 6 | 2-1(35), 4-1565) | 3-21(100) | 100 | 0.25 | A6 |
| 7 | 2-1(25), 4-15(75) | 3-37(100) | 99.5 | 0.3 | A7 |
| 8 | 2-1(30), 4-15(70) | 3-37(100) | 99 | 0.27 | A8 |
| 9 | 2-1(35), 4-15(65) | 3-37(100) | 100 | 0.25 | A9 |
| 10 | 2-2(15), 4-15(85) | 3-17(100) | 99.5 | 0.45 | A10 |
| 11 | 2-2(20), 4-15(80) | 3-17(100) | 99 | 0.40 | A11 |
| 12 | 2-2(25), 4-15(75) | 3-17(100) | 100 | 0.37 | A12 |
| 13 | 2-2(15), 4-15(85) | 3-21(100) | 99.5 | 0.39 | A13 |
| 14 | 2-2(20), 4-15(80) | 3-21(100) | 99 | 0.35 | A14 |
| 15 | 2-2(25), 4-15(75) | 3-21(100) | 100 | 0.32 | A15 |
| 16 | 2-2(15), 4-15(85) | 3-37(100) | 99.5 | 0.35 | A16 |
| 17 | 2-2(20), 4-15(80) | 3-37(100) | 99 | 0.32 | A17 |
| 18 | 2-2(25), 4-15(75) | 3-37(100) | 100 | 0.3 | A18 |
| 19 | 2-3(10), 4-15(90) | 3-17(100) | 99 | 0.5 | A19 |
| 20 | 2-3(15), 4-15(85) | 3-17(100) | 100 | 0.4 | A20 |
| 21 | 2-3(20), 4-15(80) | 3-17(100) | 100 | 0.3 | A21 |
| 22 | 2-3(10), 4-15(90) | 3-21(100) | 99 | 0.4 | A22 |
| 23 | 2-3(15), 4-15(85) | 3-21(100) | 100 | 0.35 | A23 |
| 24 | 2-3(20), 4-15(80) | 3-21(100) | 100 | 0.32 | A24 |
| 25 | 2-3(10), 4-15(90) | 3-37(100) | 99 | 0.45 | A25 |
| 26 | 2-3(15), 4-15(85) | 3-37(100) | 100 | 0.4 | A26 |
| 27 | 2-3(20), 4-15(80) | 3-37(100) | 100 | 0.3 | A27 |
| 28 | 2-1(10), 4-15(90) | 3-17(100) | 0 | 0.69 | A28 |
| 29 | 2-1(10), 4-15(90) | 3-21(100) | 0 | 0.75 | A29 |
| 30 | 2-1(10), 4-15(90) | 3-37(100) | 0 | 0.56 | A30 |
| 31 | 2-2(10), 4-15(90) | 3-17(100) | 0 | 0.65 | A31 |
| 32 | 2-2(10), 4-15(90) | 3-21(100) | 0 | 0.59 | A32 |
| 33 | 2-2(10), 4-15(90) | 3-37(100) | 0 | 0.62 | A33 |
| 34 | 2-3(10), 4-15(90) | 3-17(100) | 0 | 0.7 | A34 |
| 35 | 2-3(10), 4-15(90) | 3-21(100) | 0 | 0.63 | A35 |

TABLE 6-continued

| | diamine (mmole) | tetracarboxylic acid dianhydride (mmole) | imidization rate (%) | intrinsic viscosity (dl/g) | polymer |
|---|---|---|---|---|---|
| 36 | 2-3(10), 4-15(90) | 3-37(100) | 0 | 0.61 | A36 |
| 37 | 2-1(10), 4-15(90) | 3-17(100) | 0 | 0.65 | A37 |
| 38 | 2-1(10), 4-15(90) | 3-21(100) | 0 | 0.62 | A38 |
| 39 | 2-1(10), 4-15(90) | 3-37(100) | 0 | 0.64 | A39 |
| 40 | 2-2(10), 4-15(90) | 3-17(100) | 0 | 0.64 | A40 |
| 41 | 2-2(10), 4-15(90) | 3-21(100) | 0 | 0.62 | A41 |
| 42 | 2-2(10), 4-15(90) | 3-37(100) | 0 | 0.71 | A42 |
| 43 | 2-3(10), 4-15(90) | 3-17(100) | 0 | 0.68 | A43 |
| 44 | 2-3(10), 4-15(90) | 3-21(100) | 0 | 0.64 | A44 |
| 45 | 2-3(10), 4-15(90) | 3-37(100) | 0 | 0.57 | A45 |
| 46 | 2-1(5), 2-2(5), 4-15(90) | 3-17(100) | 100 | 0.6 | A46 |
| 47 | 2-1(5), 2-2(5), 4-15(90) | 3-21(100) | 100 | 0.3 | A47 |
| 48 | 2-1(5), 2-2(5), 4-15(90) | 3-37(100) | 100 | 0.7 | A48 |
| 49 | 2-1(5), 2-3(5), 4-15(90) | 3-17(100) | 100 | 0.5 | A49 |
| 50 | 2-1(5), 2-3(5), 4-15(90) | 3-21(100) | 100 | 0.2 | A50 |
| 51 | 2-1(5), 2-3(5), 4-15(90) | 3-37(100) | 100 | 0.6 | A51 |
| 52 | 2-2(5), 2-3(5), 4-15(90) | 3-17(100) | 100 | 0.5 | A52 |
| 53 | 2-2(5), 2-3(5), 4-15(90) | 3-21(100) | 100 | 0.3 | A53 |
| 54 | 2-2(5), 2-3(5), 4-15(90) | 3-37(100) | 100 | 0.7 | A54 |
| 55 | 2-1(10), 4-15(90) | 3-17(50), 3-21(50) | 99 | 0.3 | A55 |
| 56 | 2-2(10), 4-15(90) | 3-17(50), 3-21(50) | 98 | 0.35 | A56 |
| 57 | 2-3(10), 4-15(90) | 3-17(50), 3-21(50) | 99 | 0.34 | A57 |
| 58 | 2-1(10), 4-15(90) | 3-17(50), 3-37(50) | 97 | 0.35 | A58 |
| 59 | 2-2(10), 4-15(90) | 3-17(50), 3-37(50) | 98 | 0.37 | A59 |
| 60 | 2-3(10), 4-15(90) | 3-17(50), 3-37(50) | 100 | 0.25 | A60 |
| 61 | 2-1(10), 4-15(90) | 3-21(50), 3-37(50) | 98 | 0.34 | A61 |
| 62 | 2-2(10), 4-15(90) | 3-21(50), 3-37(50) | 100 | 0.28 | A62 |
| 63 | 2-3(10), 4-15(90) | 3-21(50), 3-37(50) | 97 | 0.38 | A63 |
| 64 | 2-4(10), 4-15(90) | 3-37(100) | 99 | 0.32 | A64 |
| 65 | 2-5(10), 4-15(90) | 3-37(100) | 100 | 0.28 | A65 |
| 66 | 2-6(10), 4-15(90) | 3-37(100) | 100 | 0.25 | A66 |
| 67 | 2-7(10), 4-15(90) | 3-37(100) | 99 | 0.33 | A67 |
| 68 | 2-8(10), 4-15(90) | 3-37(100) | 98 | 0.3 | A68 |
| 69 | 2-9(10), 4-15(90) | 3-37(100) | 100 | 0.25 | A69 |
| 70 | 2-10(10), 4-15(90) | 3-37(100) | 99 | 0.3 | A70 |
| 71 | 2-11(10), 4-15(90) | 3-37(100) | 100 | 0.26 | A71 |
| 72 | 2-12(10), 4-15(90) | 3-37(100) | 99 | 0.32 | A72 |
| 73 | 2-13(10), 4-15(90) | 3-37(100) | 98 | 0.35 | A73 |
| 74 | 2-14(10), 4-15(90) | 3-37(100) | 100 | 0.3 | A74 |
| 75 | 2-15(10), 4-15(90) | 3-37(100) | 97 | 0.35 | A75 |
| 76 | 2-16(10), 4-15(90) | 3-37(100) | 99 | 0.33 | A76 |
| 77 | 2-17(10), 4-15(90) | 3-37(100) | 100 | 0.28 | A77 |
| 78 | 2-18(10), 4-15(90) | 3-37(100) | 98 | 0.32 | A78 |
| 79 | 2-19(10), 4-15(90) | 3-37(100) | 100 | 0.25 | A79 |
| 80 | 2-20(10), 4-15(90) | 3-37(100) | 100 | 0.27 | A80 |
| 81 | 2-21(10), 4-15(90) | 3-37(100) | 100 | 0.3 | A81 |
| 82 | 2-22(10), 4-15(90) | 3-37(100) | 100 | 0.4 | A82 |
| 83 | 2-23(10), 4-15(90) | 3-37(100) | 100 | 0.3 | A83 |
| 84 | 2-24(10), 4-15(90) | 3-37(100) | 98 | 0.5 | A84 |
| 85 | 2-25(10), 4-15(90) | 3-37(100) | 99 | 0.6 | A85 |
| 86 | 2-26(10), 4-15(90) | 3-37(100) | 98 | 0.4 | A86 |
| 87 | 2-27(10), 4-15(90) | 3-37(100) | 97 | 0.3 | A87 |
| 88 | 2-28(10), 4-15(90) | 3-37(100) | 100 | 0.4 | A88 |
| 89 | 2-29(10), 4-15(90) | 3-37(100) | 98 | 0.3 | A89 |
| 90 | 2-30(10), 4-15(90) | 3-37(100) | 99 | 0.2 | A90 |
| 91 | 2-31(10), 4-15(90) | 3-37(100) | 100 | 0.3 | A91 |
| 92 | 2-32(10), 4-15(90) | 3-37(100) | 98 | 0.2 | A92 |
| 93 | 2-33(10), 4-15(90) | 3-37(100) | 100 | 0.2 | A93 |
| 94 | 2-34(10), 4-15(90) | 3-37(100) | 97 | 0.3 | A94 |
| 95 | 2-35(10), 4-15(90) | 3-37(100) | 100 | 0.2 | A95 |
| 96 | 2-36(10), 4-15(90) | 3-37(100) | 98 | 0.3 | A96 |
| 97 | 2-37(10), 4-15(90) | 3-37(100) | 99 | 0.4 | A97 |
| 98 | 2-38(10), 4-15(90) | 3-37(100) | 100 | 0.3 | A98 |
| 99 | 2-39(10), 4-15(90) | 3-37(100) | 98 | 0.2 | A99 |
| 100 | 2-40(10), 4-15(90) | 3-37(100) | 100 | 0.2 | A100 |
| 101 | 2-41(10), 4-15(90) | 3-37(100) | 100 | 0.2 | A101 |
| 102 | 2-42(10), 4-15(90) | 3-37(100) | 99 | 0.2 | A102 |
| 103 | 2-43(10), 4-15(90) | 3-37(100) | 98 | 0.5 | A103 |
| 104 | 2-44(10), 4-15(90) | 3-37(100) | 100 | 0.25 | A104 |
| 105 | 2-45(10), 4-15(90) | 3-37(100) | 99 | 0.3 | A105 |
| 106 | 2-46(10), 4-15(90) | 3-37(100) | 98 | 0.3 | A106 |
| 107 | 2-47(10), 4-15(90) | 3-37(100) | 100 | 0.21 | A107 |
| 108 | 2-48(10), 4-15(90) | 3-37(100) | 99 | 0.3 | A108 |
| 109 | 2-49(10), 4-15(90) | 3-37(100) | 98 | 0.5 | A109 |
| 110 | 2-50(10), 4-15(90) | 3-37(100) | 100 | 0.16 | A110 |
| 111 | 2-51(10), 4-15(90) | 3-37(100) | 98 | 0.5 | A111 |
| 112 | 2-52(10), 4-15(90) | 3-37(100) | 99 | 0.5 | A112 |

TABLE 6-continued

| | diamine (mmole) | tetracarboxylic acid dianhydride (mmole) | imidization rate (%) | intrinsic viscosity (dl/g) | polymer |
|---|---|---|---|---|---|
| 113 | 2-53(10), 4-15(90) | 3-37(100) | 97 | 0.4 | A113 |
| 114 | 2-54(10), 4-15(90) | 3-37(100) | 100 | 0.16 | A114 |
| 115 | 2-55(10), 4-15(90) | 3-37(100) | 98 | 0.5 | A115 |
| 116 | 2-56(10), 4-15(90) | 3-37(100) | 99 | 0.6 | A116 |
| 117 | 2-57(10), 4-15(90) | 3-37(100) | 97 | 0.6 | A117 |
| 118 | 2-58(10), 4-15(90) | 3-37(100) | 100 | 0.25 | A118 |
| 119 | 2-59(10), 4-15(90) | 3-37(100) | 98 | 0.6 | A119 |
| 120 | 2-60(10), 4-15(90) | 3-37(100) | 99 | 0.5 | A120 |
| 121 | 2-61(10), 4-15(90) | 3-37(100) | 99 | 0.4 | A121 |
| 122 | 2-62(10), 4-15(90) | 3-37(100) | 100 | 0.23 | A122 |
| 123 | 2-63(10), 4-15(90) | 3-37(100) | 100 | 0.24 | A123 |
| 124 | 2-64(10), 4-15(90) | 3-37(100) | 98 | 0.3 | A124 |
| 125 | 2-65(10), 4-15(90) | 3-37(100) | 99 | 0.7 | A125 |
| 126 | 2-66(10), 4-15(90) | 3-37(100) | 97 | 0.8 | A126 |
| 127 | 2-67(10), 4-15(90) | 3-37(100) | 100 | 0.27 | A127 |
| 128 | 2-68(10), 4-15(90) | 3-37(100) | 98 | 0.6 | A128 |
| 129 | 2-69(10), 4-15(90) | 3-37(100) | 97 | 0.7 | A129 |
| 130 | 2-70(10), 4-15(90) | 3-37(100) | 99 | 0.8 | A130 |
| 131 | 2-71(10), 4-15(90) | 3-37(100) | 100 | 0.17 | A131 |
| 132 | 2-72(10), 4-15(90) | 3-37(100) | 100 | 0.26 | A132 |
| 133 | 2-73(10), 4-15(90) | 3-37(100) | 98 | 0.7 | A133 |
| 134 | 2-74(10), 4-15(90) | 3-37(100) | 98 | 0.4 | A134 |
| 135 | 2-75(10), 4-15(90) | 3-37(100) | 97 | 0.3 | A135 |
| 136 | 2-76(10), 4-15(90) | 3-37(100) | 100 | 0.28 | A136 |
| 137 | 2-77(10), 4-15(90) | 3-37(100) | 99 | 0.8 | A137 |
| 138 | 2-78(10), 4-15(90) | 3-37(100) | 99 | 0.7 | A138 |
| 139 | 2-79(10), 4-15(90) | 3-37(100) | 100 | 0.27 | A139 |
| 140 | 2-80(10), 4-15(90) | 3-37(100) | 99 | 0.4 | A140 |
| 141 | 2-81(10), 4-15(90) | 3-37(100) | 99 | 0.5 | A141 |
| 142 | 2-82(10), 4-15(90) | 3-37(100) | 100 | 0.24 | A142 |
| 143 | 2-83(10), 4-15(90) | 3-37(100) | 99 | 0.4 | A143 |
| 144 | 2-84(10), 4-15(90) | 3-37(100) | 98 | 0.4 | A144 |
| 145 | 2-85(10), 4-15(90) | 3-37(100) | 100 | 0.23 | A145 |
| 146 | 2-86(10), 4-15(90) | 3-37(100) | 99 | 0.3 | A146 |
| control example | | | | | |
| 147 | 2-13(10), 4-15(90) | 3-37(100) | 100 | 0.28 | a1 |

TABLE 7

| synthesis example | diamine (mmole) | tetracarboxylic acid dianhydride (mmole) | imidization rate (%) | intrinsic viscosity (dl/g) | polymer |
|---|---|---|---|---|---|
| 148 | 1-14(100) | 3-37(40), 1-1(60) | 38 | 0.8 | B1 |
| 149 | 1-15(100) | 3-37(40), 1-1(60) | 36 | 1 | B2 |
| 150 | 1-16(100) | 3-37(40), 1-1(60) | 39 | 0.9 | B3 |
| 151 | 1-17(100) | 3-37(40), 1-1(60) | 35 | 0.7 | B4 |
| 152 | 1-18(100) | 3-37(40), 1-1(60) | 37 | 0.6 | B5 |
| 153 | 1-21(100) | 3-37(40), 1-1(60) | 39 | 0.9 | B6 |
| 154 | 1-25(100) | 3-37(40), 1-1(60) | 37 | 0.6 | B7 |
| 155 | 1-26(100) | 3-37(40), 1-1(60) | 36 | 0.8 | B8 |
| 156 | 1-27(100) | 3-37(40), 1-1(60) | 39 | 0.5 | B9 |
| 157 | 1-28(100) | 3-37(40), 1-1(60) | 36 | 0.9 | B10 |
| 158 | 1-29(100) | 3-37(40), 1-1(60) | 35 | 0.7 | B11 |
| 159 | 1-30(100) | 3-37(40), 1-1(60) | 39 | 0.9 | B12 |
| 160 | 1-32(100) | 3-37(40), 1-1(60) | 40 | 0.7 | B13 |
| 161 | 4-3(100) | 3-37(40), 1-1(60) | 38 | 0.6 | B14 |
| 162 | 4-14(100) | 3-37(40), 1-1(60) | 36 | 0.7 | B15 |
| 163 | 4-15(100) | 3-37(40), 1-1(60) | 39 | 0.9 | B16 |
| 164 | 4-23(100) | 3-37(40), 1-1(60) | 0 | 1 | B17 |
| 165 | 4-24(100) | 3-37(40), 1-1(60) | 35 | 0.8 | B18 |
| 166 | 4-28(100) | 3-37(40), 1-1(60) | 36 | 0.5 | B19 |
| 167 | 4-31(100) | 3-37(40), 1-1(60) | 38 | 0.9 | B20 |
| 168 | 4-37(100) | 3-37(40), 1-1(60) | 40 | 0.7 | B21 |
| 169 | 4-38(100) | 3-37(40), 1-1(60) | 39 | 0.6 | B22 |
| 170 | 4-39(100) | 3-37(40), 1-1(60) | 40 | 0.9 | B23 |
| 171 | 4-56(100) | 3-37(40), 1-1(60) | 38 | 0.8 | B24 |
| 172 | 4-65(100) | 3-37(40), 1-1(60) | 39 | 0.6 | B25 |
| 173 | 4-75(100) | 3-37(40), 1-1(60) | 35 | 0.8 | B26 |
| 174 | 1-14(100) | 3-37(40), 1-2(60) | 38 | 0.7 | B27 |
| 175 | 1-14(100) | 3-37(40), 1-3(60) | 35 | 0.8 | B28 |
| 176 | 1-14(100) | 3-37(40), 1-4(60) | 37 | 0.6 | B29 |
| 177 | 1-14(100) | 3-37(40), 1-5(60) | 35 | 0.7 | B30 |

TABLE 7-continued

| synthesis example | diamine (mmole) | tetracarboxylic acid dianhydride (mmole) | imidization rate (%) | intrinsic viscosity (dl/g) | polymer |
|---|---|---|---|---|---|
| 178 | 1-14(100) | 3-37(40), 1-6(60) | 37 | 0.4 | B31 |
| 179 | 1-14(100) | 3-37(40), 1-7(60) | 40 | 0.9 | B32 |
| 180 | 1-14(100) | 3-37(40), 1-8(60) | 38 | 0.7 | B33 |
| 181 | 1-14(100) | 3-37(40), 1-9(60) | 35 | 0.6 | B34 |
| 182 | 1-14(100) | 3-37(40), 1-10(60) | 39 | 0.8 | B35 |
| 183 | 1-14(100) | 3-37(40), 1-11(60) | 37 | 0.7 | B36 |
| 184 | 1-14(100) | 3-37(40), 1-12(60) | 37 | 0.6 | B37 |
| 185 | 1-14(100) | 3-37(40), 1-13(60) | 40 | 0.9 | B38 |
| 186 | 1-14(100) | 3-37(40), 3-1(60) | 39 | 0.5 | B39 |
| 187 | 1-14(100) | 3-37(40), 3-2(60) | 38 | 0.7 | B40 |
| 188 | 1-14(100) | 3-37(40), 3-8(60) | 35 | 0.8 | B41 |
| 189 | 1-14(100) | 3-37(40), 3-11(60) | 39 | 0.8 | B42 |
| 190 | 1-14(100) | 3-37(40), 3-17(60) | 37 | 0.7 | B43 |
| 191 | 1-14(100) | 3-37(40), 3-21(60) | 37 | 0.6 | B44 |
| 192 | 1-14(100) | 3-37(40), 3-25(60) | 40 | 0.9 | B45 |
| 193 | 1-14(100) | 3-37(40), 3-29(60) | 37 | 0.6 | B46 |
| 194 | 1-14(100) | 3-37(40), 3-31(60) | 40 | 0.9 | B47 |
| 195 | 1-14(100) | 3-37(40), 3-36(60) | 39 | 0.9 | B48 |
| 196 | 1-14(100) | 3-37(40), 3-41(60) | 37 | 0.7 | B49 |
| 197 | 1-14(100) | 3-37(100) | 40 | 0.6 | B50 |
| 198 | 1-14(100) | 3-37(40), 1-1(30), 1-7(30) | 38 | 0.9 | B51 |
| 199 | 1-14(100) | 3-37(40), 1-1(30), 3-2(30) | 36 | 0.8 | B52 |
| 200 | 1-14(100) | 3-37(40), 1-1(30), 3-25(30) | 39 | 0.7 | B53 |
| 201 | 1-14(100) | 3-37(40), 1-1(30), 3-29(30) | 37 | 0.6 | B54 |
| 202 | 1-14(100) | 3-37(40), 1-7(30), 3-2(30) | 40 | 0.9 | B55 |
| 203 | 1-14(100) | 3-37(40), 1-7(30), 3-25(30) | 39 | 0.5 | B56 |
| 204 | 1-14(100) | 3-37(40), 1-7(30), 3-29(30) | 38 | 0.7 | B57 |
| 205 | 1-14(100) | 3-37(40), 3-2(30), 3-25(30) | 35 | 0.8 | B58 |
| 206 | 1-14(100) | 3-37(40), 3-2(30), 3-29(30) | 37 | 0.6 | B59 |
| 207 | 1-14(100) | 3-37(40), 3-25(30), 3-29(30) | 35 | 0.7 | B60 |
| 208 | 1-14(100) | 3-37(50), 1-1(50) | 48 | 0.5 | B61 |
| 209 | 1-14(100) | 3-37(30), 1-1(70) | 0 | 0.8 | B62 |
| 210 | 1-14(100) | 3-37(20), 1-1(80) | 0 | 0.9 | B63 |
| 211 | 1-14(100) | 3-37(10), 1-1(90) | 0 | 0.9 | B64 |
| 212 | 1-27(100) | 3-37(40), 1-1(30), 3-2(30) | 35 | 0.6 | B65 |
| 213 | 1-27(100) | 3-37(40), 3-2(30), 3-25(30) | 39 | 0.8 | B66 |
| 214 | 1-27(100) | 3-37(40), 3-2(30), 3-29(30) | 37 | 0.7 | B67 |
| 215 | 1-28(100) | 3-37(40), 1-1(30), 3-2(30) | 37 | 0.6 | B68 |
| 216 | 1-28(100) | 3-37(40), 3-2(30), 3-25(30) | 35 | 0.8 | B69 |
| 217 | 1-28(100) | 3-37(40), 3-2(30), 3-29(30) | 39 | 0.8 | B70 |
| 218 | 1-29(100) | 3-37(40), 1-1(30), 3-2(30) | 37 | 0.4 | B71 |
| 219 | 1-29(100) | 3-37(40), 3-2(30), 3-25(30) | 40 | 0.9 | B72 |
| 220 | 1-29(100) | 3-37(40), 3-2(30), 3-29(30) | 38 | 0.7 | B73 |
| 221 | 1-1.4(50), 1-27(50) | 3-37(40), 3-2(30), 3-25(30) | 35 | 0.6 | B74 |
| 222 | 1-14(50), 1-28(50) | 3-37(40), 3-2(30), 3-25(30) | 37 | 0.6 | B75 |
| 223 | 1-14(50), 1-29(50) | 3-37(40), 3-2(30), 3-25(30) | 39 | 0.9 | B76 |
| 224 | 1-27(50), 1-28(50) | 3-37(40), 3-2(30), 3-25(30) | 37 | 0.6 | B77 |
| 225 | 1-27(50), 1-29(50) | 3-37(40), 3-2(30), 3-25(30) | 36 | 0.8 | B78 |
| 226 | 1-28(50), 1-29(50) | 3-37(40), 3-2(30), 3-25(30) | 37 | 0.6 | B79 |
| 227 | 4-37(100) | 3-2(50), 3-25(50) | 0 | 0.7 | b1 |
| 228 | 1-14(100) | 3-2(50), 3-25(50) | 0 | 0.7 | b2 |

The experimental methods of the synthesis examples and the control examples are described in the following.

A solid polymer A and a solid polymer B (the ratio of A to B was fixed) were dissolved in γ-butyrolactone and N-methyl-2-pyrrolidone to form a solution with solids content of 6 wt %. The solution was filtered by a filter with 1 um diameter. The filtered solution was the liquid crystal alignment solution according to the present invention.

The liquid crystal alignment solution was applied to a glass substrate by a roller printer. A drying process was then performed with a heating plate at 200 degrees centigrade for 20 minutes to form a film with 0.05 um thickness. A rubbing process, in a fixed direction, was performed on the film under the conditions that the roller rotation speed was 1000 spins/min, the platform moving speed was 60 ms/sec and the penetration depth was 0.4 um.

A film was coated on the substrate, and spacers were sprayed on another substrate. Thereafter, the above-mentioned two substrates were formed together with the way that the rubbing directions are perpendicular with each other. Afterwards, the liquid crystal (ZLI-4792) were injected into the gap between two substrates and the injection hole was then sealed so as to form a liquid crystal display device.

The liquid crystal display device was evaluated with pretilt angle, rubbing property, voltage holding ratio, residual direct current, adhesion and reliability. The evaluation results were shown in Table 8.

TABLE 8

| Example | Polymers (weight ratio) | Pre-tilt angle | VHR (%) | RDC (V) | Reliability | Adhesion | Rubbing |
|---|---|---|---|---|---|---|---|
| 1 | A1(1), B40(4) | 3.2 | 97.2 | 0.33 | excellent | excellent | excellent |
| 2 | A2(1), B40(4) | 4.5 | 96.8 | 0.42 | excellent | excellent | excellent |
| 3 | A3(1), B40(4) | 5.7 | 97.6 | 0.53 | excellent | excellent | excellent |
| 4 | A4(1), B40(4) | 3.0 | 98.9 | 0.21 | excellent | excellent | excellent |
| 5 | A5(1), B40(4) | 4.4 | 95.8 | 0.39 | excellent | excellent | excellent |
| 6 | A6(1), B40(4) | 6.0 | 98.6 | 0.25 | excellent | excellent | excellent |
| 7 | A7(1), B40(4) | 3.1 | 94.6 | 0.49 | excellent | excellent | excellent |
| 8 | A8(1), B40(4) | 4.2 | 96.7 | 0.32 | excellent | excellent | excellent |
| 9 | A9(1), B40(4) | 5.2 | 98.6 | 0.50 | excellent | excellent | excellent |
| 10 | A10(1), B40(4) | 5.0 | 97.6 | 0.24 | excellent | excellent | excellent |
| 11 | A11(1), B40(4) | 6.9 | 95.9 | 0.35 | excellent | excellent | excellent |
| 12 | A12(1), B40(4) | 8.8 | 98.1 | 0.23 | excellent | excellent | excellent |
| 13 | A13(1), B40(4) | 4.8 | 99.0 | 0.42 | excellent | excellent | excellent |
| 14 | A14(1), B40(4) | 6.9 | 96.8 | 0.32 | excellent | excellent | excellent |
| 15 | A15(1), B40(4) | 8.6 | 95.9 | 0.42 | excellent | excellent | excellent |
| 16 | A16(1), B40(4) | 4.9 | 96.7 | 0.49 | excellent | excellent | excellent |
| 17 | A17(1), B40(4) | 6.8 | 98.1 | 0.39 | excellent | excellent | excellent |
| 18 | A18(1), B40(4) | 8.5 | 95.3 | 0.44 | excellent | excellent | excellent |
| 19 | A19(1), B40(4) | 6.5 | 98.1 | 0.35 | excellent | excellent | excellent |
| 20 | A20(1), B40(4) | 8.5 | 96.4 | 0.31 | excellent | excellent | excellent |
| 21 | A21(1), B40(4) | 9.9 | 98.6 | 0.44 | excellent | excellent | excellent |
| 22 | A22(1), B40(4) | 6.8 | 96.5 | 0.32 | excellent | excellent | excellent |
| 23 | A23(1), B40(4) | 8.9 | 95.3 | 0.53 | excellent | excellent | excellent |
| 24 | A24(1), B40(4) | 10.1 | 97.2 | 0.46 | excellent | excellent | excellent |
| 25 | A25(1), B40(4) | 6.5 | 97.2 | 0.41 | excellent | excellent | excellent |
| 26 | A26(1), B40(4) | 8.3 | 96.3 | 0.26 | excellent | excellent | excellent |
| 27 | A27(1), B40(4) | 9.7 | 96.1 | 0.35 | excellent | excellent | excellent |
| 28 | A28(1), B40(4) | 4.5 | 96.7 | 0.58 | excellent | excellent | excellent |
| 29 | A29(1), B40(4) | 4.4 | 95.9 | 0.37 | excellent | excellent | excellent |
| 30 | A30(1), B40(4) | 4.2 | 98.2 | 0.39 | excellent | excellent | excellent |
| 31 | A31(1), B40(4) | 6.9 | 96.7 | 0.52 | excellent | excellent | excellent |
| 32 | A32(1), B40(4) | 6.9 | 94.4 | 0.41 | excellent | excellent | excellent |
| 33 | A33(1), B40(4) | 6.8 | 97.0 | 0.36 | excellent | excellent | excellent |
| 34 | A34(1), B40(4) | 8.5 | 96.3 | 0.43 | excellent | excellent | excellent |
| 35 | A35(1), B40(4) | 8.9 | 97.2 | 0.52 | excellent | excellent | excellent |
| 36 | A36(1), B40(4) | 8.3 | 98.1 | 0.41 | excellent | excellent | excellent |
| 37 | A37(1), B40(4) | 4.3 | 93.1 | 0.32 | excellent | excellent | excellent |
| 38 | A38(1), B40(4) | 4.2 | 96.8 | 0.33 | excellent | excellent | excellent |
| 39 | A39(1), B40(4) | 4.0 | 97.0 | 0.51 | excellent | excellent | excellent |
| 40 | A40(1), B40(4) | 6.5 | 96.5 | 0.36 | excellent | excellent | excellent |
| 41 | A41(1), B40(4) | 6.6 | 95.1 | 0.43 | excellent | excellent | excellent |
| 42 | A42(1), B40(4) | 6.5 | 96.2 | 0.35 | excellent | excellent | excellent |
| 43 | A43(1), B40(4) | 8.3 | 97.3 | 0.38 | excellent | excellent | excellent |
| 44 | A44(1), B40(4) | 8.6 | 98.2 | 0.49 | excellent | excellent | excellent |
| 45 | A45(1), B40(4) | 8.0 | 96.9 | 0.28 | excellent | excellent | excellent |
| 46 | A46(1), B40(4) | 4.9 | 97.0 | 0.36 | excellent | excellent | excellent |
| 47 | A47(1), B40(4) | 4.8 | 98.5 | 0.48 | excellent | excellent | excellent |
| 48 | A48(1), B40(4) | 4.8 | 93.5 | 0.33 | excellent | excellent | excellent |
| 49 | A49(1), B40(4) | 5.3 | 97.1 | 0.25 | excellent | excellent | excellent |
| 50 | A50(1), B40(4) | 5.5 | 98.2 | 0.34 | excellent | excellent | excellent |
| 51 | A51(1), B40(4) | 5.4 | 97.6 | 0.51 | excellent | excellent | excellent |
| 52 | A52(1), B40(4) | 7.2 | 95.2 | 0.36 | excellent | excellent | excellent |
| 53 | A53(1), B40(4) | 7.5 | 99.0 | 0.42 | excellent | excellent | excellent |
| 54 | A54(1), B40(4) | 7.3 | 96.4 | 0.36 | excellent | excellent | excellent |
| 55 | A55(1), B40(4) | 4.3 | 96.5 | 0.45 | excellent | excellent | excellent |
| 56 | A56(1), B40(4) | 6.5 | 97.2 | 0.37 | excellent | excellent | excellent |
| 57 | A57(1), B40(4) | 8.5 | 98.3 | 0.26 | excellent | excellent | excellent |
| 58 | A58(1), B40(4) | 4.2 | 96.5 | 0.37 | excellent | excellent | excellent |
| 59 | A59(1), B40(4) | 6.3 | 97.2 | 0.60 | excellent | excellent | excellent |

TABLE 8-continued

| Example | Polymers (weight ratio) | Pre-tilt angle | VHR (%) | RDC (V) | Reliability | Adhesion | Rubbing |
|---|---|---|---|---|---|---|---|
| 60 | A60(1), B40(4) | 8.3 | 96.9 | 0.53 | excellent | excellent | excellent |
| 61 | A61(1), B40(4) | 4.0 | 96.5 | 0.32 | excellent | excellent | excellent |
| 62 | A62(1), B40(4) | 6.1 | 94.8 | 0.53 | excellent | excellent | excellent |
| 63 | A63(1), B40(4) | 8.3 | 97.6 | 0.46 | excellent | excellent | excellent |
| 64 | A64(1), B40(4) | 4.3 | 96.8 | 0.35 | excellent | excellent | excellent |
| 65 | A65(1), B40(4) | 6.5 | 94.6 | 0.46 | excellent | excellent | excellent |
| 66 | A66(1), B40(4) | 8.9 | 96.5 | 0.52 | excellent | excellent | excellent |
| 67 | A67(1), B40(4) | 4.9 | 98.4 | 0.32 | excellent | excellent | excellent |
| 68 | A68(1), B40(4) | 6.6 | 97.0 | 0.31 | excellent | excellent | excellent |
| 69 | A69(1), B40(4) | 9.0 | 96.8 | 0.48 | excellent | excellent | excellent |
| 70 | A70(1), B40(4) | 5.0 | 97.6 | 0.38 | excellent | excellent | excellent |
| 71 | A71(1), B40(4) | 7.1 | 95.3 | 0.46 | excellent | excellent | excellent |
| 72 | A72(1), B40(4) | 9.3 | 94.8 | 0.47 | excellent | excellent | excellent |
| 73 | A73(1), B40(4) | 4.3 | 97.9 | 0.53 | excellent | excellent | excellent |
| 74 | A74(1), B40(4) | 5.8 | 96.8 | 0.60 | excellent | excellent | excellent |
| 75 | A75(1), B40(4) | 4.2 | 97.6 | 0.29 | excellent | excellent | excellent |
| 76 | A76(1), B40(4) | 6.0 | 98.2 | 0.23 | excellent | excellent | excellent |
| 77 | A77(1), B40(4) | 4.3 | 97.3 | 0.53 | excellent | excellent | excellent |
| 78 | A78(1), B40(4) | 5.9 | 96.5 | 0.30 | excellent | excellent | excellent |
| 79 | A79(1), B40(4) | 4.0 | 97.5 | 0.42 | excellent | excellent | excellent |
| 80 | A80(1), B40(4) | 5.7 | 98.6 | 0.32 | excellent | excellent | excellent |
| 81 | A81(1), B40(4) | 6.3 | 98.3 | 0.35 | excellent | excellent | excellent |
| 82 | A82(1), B40(4) | 5.7 | 96.5 | 0.41 | excellent | excellent | excellent |
| 83 | A83(1), B40(4) | 6.1 | 97.6 | 0.50 | excellent | excellent | excellent |
| 84 | A84(1), B40(4) | 5.5 | 94.3 | 0.32 | excellent | excellent | excellent |
| 85 | A85(1), B40(4) | 6.0 | 95.0 | 0.51 | excellent | excellent | excellent |
| 86 | A86(1), B40(4) | 5.4 | 98.5 | 0.33 | excellent | excellent | excellent |
| 87 | A87(1), B40(4) | 5.9 | 96.3 | 0.38 | excellent | excellent | excellent |
| 88 | A88(1), B40(4) | 5.5 | 97.5 | 0.46 | excellent | excellent | excellent |
| 89 | A89(1), B40(4) | 4.7 | 96.7 | 0.63 | excellent | excellent | excellent |
| 90 | A90(1), B40(4) | 4.9 | 96.0 | 0.21 | excellent | excellent | excellent |
| 91 | A91(1), B40(4) | 4.6 | 98.5 | 0.36 | excellent | excellent | excellent |
| 92 | A92(1), B40(4) | 5.0 | 97.2 | 0.42 | excellent | excellent | excellent |
| 93 | A93(1), B40(4) | 4.9 | 95.5 | 0.33 | excellent | excellent | excellent |
| 94 | A94(1), B40(4) | 4.8 | 97.2 | 0.39 | excellent | excellent | excellent |
| 95 | A95(1), B40(4) | 5.1 | 96.2 | 0.56 | excellent | excellent | excellent |
| 96 | A96(1), B40(4) | 4.7 | 94.8 | 0.38 | excellent | excellent | excellent |
| 97 | A97(1), B40(4) | 7.2 | 98.6 | 0.37 | excellent | excellent | excellent |
| 98 | A98(1), B40(4) | 7.1 | 97.1 | 0.25 | excellent | excellent | excellent |
| 99 | A99(1), B40(4) | 7.0 | 99.0 | 0.21 | excellent | excellent | excellent |
| 100 | A100(1), B40(4) | 6.8 | 96.1 | 0.36 | excellent | excellent | excellent |
| 101 | A101(1), B40(4) | 7.1 | 98.2 | 0.36 | excellent | excellent | excellent |
| 102 | A102(1), B40(4) | 6.9 | 96.5 | 0.33 | excellent | excellent | excellent |
| 103 | A103(1), B40(4) | 5.1 | 94.9 | 0.45 | excellent | excellent | excellent |
| 104 | A104(1), B40(4) | 6.8 | 97.3 | 0.26 | excellent | excellent | excellent |
| 105 | A105(1), B40(4) | 5.3 | 98.6 | 0.24 | excellent | excellent | excellent |
| 106 | A106(1), B40(4) | 6.9 | 95.8 | 0.31 | excellent | excellent | excellent |
| 107 | A107(1), B40(4) | 5.2 | 96.4 | 0.27 | excellent | excellent | excellent |
| 108 | A108(1), B40(4) | 6.7 | 97.6 | 0.61 | excellent | excellent | excellent |
| 109 | A109(1), B40(4) | 7.5 | 98.3 | 0.34 | excellent | excellent | excellent |
| 110 | A110(1), B40(4) | 7.3 | 98.0 | 0.51 | excellent | excellent | excellent |
| 111 | A111(1), B40(4) | 7.1 | 96.5 | 0.32 | excellent | excellent | excellent |
| 112 | A112(1), B40(4) | 7.4 | 96.4 | 0.30 | excellent | excellent | excellent |
| 113 | A113(1), B40(4) | 7.2 | 97.3 | 0.42 | excellent | excellent | excellent |
| 114 | A114(1), B40(4) | 7.0 | 98.6 | 0.48 | excellent | excellent | excellent |
| 115 | A115(1), B40(4) | 5.2 | 98.5 | 0.60 | excellent | excellent | excellent |
| 116 | A116(1), B40(4) | 7.5 | 99.0 | 0.32 | excellent | excellent | excellent |
| 117 | A117(1), B40(4) | 5.1 | 96.3 | 0.50 | excellent | excellent | excellent |
| 118 | A118(1), B40(4) | 6.8 | 98.9 | 0.35 | excellent | excellent | excellent |
| 119 | A119(1), B40(4) | 5.0 | 94.9 | 0.43 | excellent | excellent | excellent |
| 120 | A120(1), B40(4) | 7.1 | 95.1 | 0.60 | excellent | excellent | excellent |
| 121 | A121(1), B40(4) | 5.7 | 98.2 | 0.45 | excellent | excellent | excellent |
| 122 | A122(1), B40(4) | 5.5 | 96.3 | 0.35 | excellent | excellent | excellent |
| 123 | A123(1), B40(4) | 6.3 | 97.1 | 0.60 | excellent | excellent | excellent |
| 124 | A124(1), B40(4) | 6.9 | 96.6 | 0.21 | excellent | excellent | excellent |
| 125 | A125(1), B40(4) | 4.0 | 98.3 | 0.25 | excellent | excellent | excellent |
| 126 | A126(1), B40(4) | 5.8 | 94.2 | 0.35 | excellent | excellent | excellent |
| 127 | A127(1), B40(4) | 6.2 | 93.7 | 0.32 | excellent | excellent | excellent |
| 128 | A128(1), B40(4) | 5.5 | 96.7 | 0.53 | excellent | excellent | excellent |
| 129 | A129(1), B40(4) | 4.8 | 98.2 | 0.26 | excellent | excellent | excellent |
| 130 | A130(1), B40(4) | 5.3 | 96.4 | 0.23 | excellent | excellent | excellent |
| 131 | A131(1), B40(4) | 5.3 | 98.5 | 0.33 | excellent | excellent | excellent |
| 132 | A132(1), B40(4) | 5.0 | 96.4 | 0.46 | excellent | excellent | excellent |
| 133 | A133(1), B40(4) | 5.5 | 98.5 | 0.36 | excellent | excellent | excellent |
| 134 | A134(1), B40(4) | 6.0 | 96.3 | 0.41 | excellent | excellent | excellent |
| 135 | A135(1), B40(4) | 6.2 | 97.5 | 0.62 | excellent | excellent | excellent |
| 136 | A136(1), B40(4) | 4.1 | 96.0 | 0.36 | excellent | excellent | excellent |

TABLE 8-continued

| Example | Polymers (weight ratio) | Pre-tilt angle | VHR (%) | RDC (V) | Reliability | Adhesion | Rubbing |
|---|---|---|---|---|---|---|---|
| 137 | A137(1), B40(4) | 4.5 | 96.1 | 0.43 | excellent | excellent | excellent |
| 138 | A138(1), B40(4) | 3.8 | 95.7 | 0.36 | excellent | excellent | excellent |
| 139 | A139(1), B40(4) | 3.5 | 96.5 | 0.43 | excellent | excellent | excellent |
| 140 | A140(1), B40(4) | 4.8 | 98.3 | 0.22 | excellent | excellent | excellent |
| 141 | A141(1), B40(4) | 5.0 | 95.3 | 0.42 | excellent | excellent | excellent |
| 142 | A142(1), B40(4) | 4.9 | 97.3 | 0.35 | excellent | excellent | excellent |
| 143 | A143(1), B40(4) | 5.1 | 98.3 | 0.43 | excellent | excellent | excellent |
| 144 | A144(1), B40(4) | 5.0 | 95.7 | 0.63 | excellent | excellent | excellent |
| 145 | A145(1), B40(4) | 5.2 | 98.2 | 0.51 | excellent | excellent | excellent |
| 146 | A146(1), B40(4) | 5.9 | 96.2 | 0.32 | excellent | excellent | excellent |
| 147 | A8(1), B1(4) | 4.3 | 96.3 | 0.23 | excellent | excellent | excellent |
| 148 | A8(1), B2(4) | 4.1 | 94.8 | 0.51 | excellent | excellent | excellent |
| 149 | A8(1), B3(4) | 4.2 | 98.2 | 0.27 | excellent | excellent | excellent |
| 150 | A8(1), B4(4) | 4.4 | 96.3 | 0.52 | excellent | excellent | excellent |
| 151 | A8(1), B5(4) | 4.6 | 95.5 | 0.34 | excellent | excellent | excellent |
| 152 | A8(1), B6(4) | 4.2 | 97.2 | 0.44 | excellent | excellent | excellent |
| 153 | A8(1), B7(4) | 4.1 | 96.3 | 0.35 | excellent | Good | excellent |
| 154 | A8(1), B8(4) | 4.5 | 99.0 | 0.31 | excellent | Good | excellent |
| 155 | A8(1), B9(4) | 4.0 | 96.3 | 0.26 | excellent | Good | excellent |
| 156 | A8(1), B10(4) | 4.1 | 97.5 | 0.43 | excellent | Good | excellent |
| 157 | A8(1), B11(4) | 4.3 | 96.4 | 0.36 | excellent | Good | excellent |
| 158 | A8(1), B12(4) | 4.0 | 97.6 | 0.43 | excellent | Good | excellent |
| 159 | A8(1), B13(4) | 4.3 | 96.3 | 0.26 | excellent | Good | excellent |
| 160 | A8(1), B14(4) | 4.0 | 97.5 | 0.61 | excellent | excellent | Fair |
| 161 | A8(1), B15(4) | 4.1 | 98.3 | 0.24 | excellent | excellent | Good |
| 162 | A8(1), B16(4) | 4.3 | 97.5 | 0.35 | excellent | excellent | excellent |
| 163 | A8(1), B17(4) | 4.1 | 95.4 | 0.46 | excellent | excellent | excellent |
| 164 | A8(1), B18(4) | 4.4 | 96.4 | 0.42 | excellent | excellent | excellent |
| 165 | A8(1), B19(4) | 4.1 | 97.3 | 0.35 | excellent | excellent | excellent |
| 166 | A8(1), B20(4) | 4.2 | 93.4 | 0.46 | excellent | excellent | excellent |
| 167 | A8(1), B21(4) | 4.0 | 94.6 | 0.48 | excellent | excellent | excellent |
| 168 | A8(1), B22(4) | 4.3 | 96.5 | 0.29 | excellent | excellent | excellent |
| 169 | A8(1), B23(4) | 4.1 | 97.5 | 0.37 | excellent | excellent | excellent |
| 170 | A8(1), B24(4) | 4.2 | 96.3 | 0.36 | excellent | excellent | excellent |
| 171 | A8(1), B25(4) | 4.5 | 95.4 | 0.54 | excellent | excellent | excellent |
| 172 | A8(1), B26(4) | 4.2 | 97.8 | 0.35 | excellent | Good | excellent |
| 173 | A8(1), B27(4) | 4.2 | 98.6 | 0.25 | excellent | excellent | excellent |
| 174 | A8(1), B28(4) | 4.5 | 98.6 | 0.42 | excellent | excellent | excellent |
| 175 | A8(1), B29(4) | 4.2 | 96.4 | 0.35 | excellent | excellent | excellent |
| 176 | A8(1), B30(4) | 4.1 | 98.7 | 0.64 | excellent | excellent | excellent |
| 177 | A8(1), B31(4) | 4.0 | 98.6 | 0.43 | excellent | excellent | excellent |
| 178 | A8(1), B32(4) | 4.3 | 97.3 | 0.40 | excellent | excellent | excellent |
| 179 | A8(1), B33(4) | 4.2 | 95.1 | 0.32 | excellent | excellent | excellent |
| 180 | A8(1), B34(4) | 4.2 | 95.0 | 0.43 | excellent | Good | excellent |
| 181 | A8(1), B35(4) | 4.1 | 97.2 | 0.25 | excellent | Good | excellent |
| 182 | A8(1), B36(4) | 4.3 | 98.3 | 0.26 | excellent | Good | excellent |
| 183 | A8(1), B37(4) | 4.5 | 96.5 | 0.35 | excellent | Good | excellent |
| 184 | A8(1), B38(4) | 4.1 | 95.4 | 0.30 | excellent | Good | excellent |
| 185 | A8(1), B39(4) | 4.2 | 96.3 | 0.50 | excellent | excellent | excellent |
| 186 | A8(1), B40(4) | 4.3 | 98.2 | 0.25 | excellent | excellent | excellent |
| 187 | A8(1), B41(4) | 4.0 | 95.6 | 0.42 | excellent | excellent | excellent |
| 188 | A8(1), B42(4) | 4.5 | 98.3 | 0.35 | excellent | excellent | excellent |
| 189 | A8(1), B43(4) | 4.2 | 98.9 | 0.24 | reliability | excellent | excellent |
| 190 | A8(1), B44(4) | 4.1 | 97.2 | 0.50 | excellent | excellent | excellent |
| 191 | A8(1), B45(4) | 4.3 | 97.8 | 0.32 | excellent | excellent | excellent |
| 192 | A8(1), B46(4) | 4.2 | 95.3 | 0.42 | excellent | excellent | excellent |
| 193 | A8(1), B47(4) | 4.2 | 96.4 | 0.52 | excellent | excellent | excellent |
| 194 | A8(1), B48(4) | 4.6 | 95.7 | 0.36 | excellent | excellent | excellent |
| 195 | A8(1), B49(4) | 4.1 | 98.6 | 0.47 | excellent | excellent | excellent |
| 196 | A8(1), B50(4) | 4.3 | 96.3 | 0.51 | excellent | excellent | excellent |
| 197 | A8(1), B51(4) | 4.3 | 97.5 | 0.36 | excellent | excellent | excellent |
| 198 | A8(1), B52(4) | 4.0 | 97.8 | 0.45 | excellent | excellent | excellent |
| 199 | A8(1), B53(4) | 4.6 | 94.9 | 0.47 | excellent | excellent | excellent |
| 200 | A8(1), B54(4) | 4.5 | 98.6 | 0.60 | excellent | excellent | excellent |
| 201 | A8(1), B55(4) | 4.3 | 95.6 | 0.60 | excellent | excellent | excellent |
| 202 | A8(1), B56(4) | 4.2 | 98.7 | 0.38 | excellent | excellent | excellent |
| 203 | A8(1), B57(4) | 4.5 | 96.4 | 0.47 | excellent | excellent | excellent |
| 204 | A8(1), B58(4) | 4.0 | 95.1 | 0.29 | excellent | excellent | excellent |
| 205 | A8(1), B59(4) | 4.3 | 96.3 | 0.38 | excellent | excellent | excellent |
| 206 | A8(1), B60(4) | 4.1 | 95.4 | 0.51 | excellent | excellent | excellent |
| 207 | A8(1), B61(4) | 4.2 | 98.3 | 0.47 | excellent | excellent | excellent |
| 208 | A8(1), B62(4) | 4.0 | 97.8 | 0.36 | excellent | excellent | excellent |
| 209 | A8(1), B63(4) | 4.5 | 96.8 | 0.44 | excellent | excellent | excellent |
| 210 | A8(1), B64(4) | 4.1 | 99.0 | 0.36 | excellent | excellent | excellent |
| 211 | A8(1), B65(4) | 4.3 | 97.3 | 0.39 | excellent | excellent | excellent |
| 212 | A8(1), B66(4) | 4.0 | 98.3 | 0.42 | excellent | excellent | excellent |
| 213 | A8(1), B67(4) | 4.2 | 96.7 | 0.40 | excellent | excellent | excellent |

TABLE 8-continued

| Example | Polymers (weight ratio) | Pre-tilt angle | VHR (%) | RDC (V) | Reliability | Adhesion | Rubbing |
|---|---|---|---|---|---|---|---|
| 214 | A8(1), B68(4) | 4.5 | 98.7 | 0.44 | excellent | excellent | excellent |
| 215 | A8(1), B69(4) | 4.1 | 98.5 | 0.25 | excellent | excellent | excellent |
| 216 | A8(1), B70(4) | 4.0 | 96.7 | 0.38 | excellent | excellent | excellent |
| 217 | A8(1), B71(4) | 4.3 | 95.7 | 0.49 | excellent | excellent | excellent |
| 218 | A8(1), B72(4) | 4.1 | 96.8 | 0.63 | excellent | excellent | excellent |
| 219 | A8(1), B73(4) | 4.4 | 96.9 | 0.45 | excellent | excellent | excellent |
| 220 | A8(1), B74(4) | 4.1 | 98.5 | 0.23 | excellent | excellent | excellent |
| 221 | A8(1), B75(4) | 4.2 | 95.6 | 0.40 | excellent | excellent | excellent |
| 222 | A8(1), B76(4) | 4.0 | 98.4 | 0.29 | excellent | excellent | excellent |
| 223 | A8(1), B77(4) | 4.4 | 97.6 | 0.37 | excellent | excellent | excellent |
| 224 | A8(1), B78(4) | 4.6 | 96.8 | 0.48 | excellent | excellent | excellent |
| 225 | A8(1), B79(4) | 4.1 | 95.9 | 0.31 | excellent | excellent | excellent |
| 1 | a1(1), b1(4) | 4.7 | 88.3 | 1.21 | Fair | Excellent | Good |
| 2 | a1(1), b2(4) | 4.9 | 85.1 | 1.53 | Fair | Excellent | Good |

In summary, the liquid crystal alignment layer formed by the liquid crystal alignment solution of the present invention has the characteristics of stable pre-tilt angle, high voltage holding ratio, low residual direct current, good rubbing and high reliability. Therefore, the formed liquid crystal alignment layer can be applied to various display devices of equipments, such as desktop computer screen, watch, cell phone panel, personal computer, liquid crystal data projector and liquid crystal television (TV), etc.

This invention has been disclosed above in the preferred embodiments, but is not limited to those. It is known to persons skilled in the art that some modifications and innovations may be made without departing from the spirit and scope of this invention. Hence, the scope of this invention should be defined by the following claims.

What is claimed is:

1. A liquid crystal alignment solution, comprising at least one polymer selected from the group consisting of a polyamide acid-polyamide acid polymer represented by formula (A), a polyimide-polyamide acid polymer represented by formula (B) and a polyimide-polyimide polymer represented by formula (C),

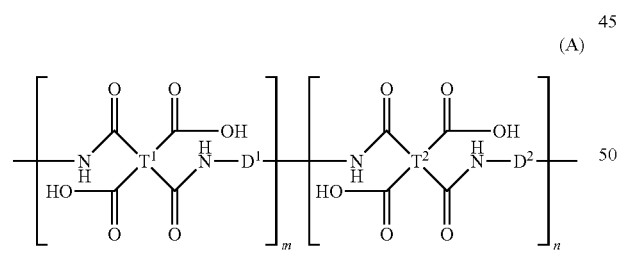

(A)

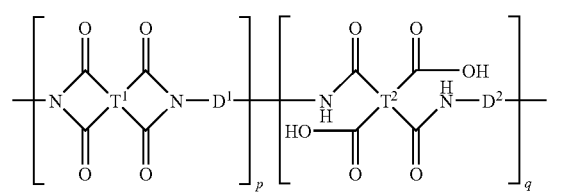

(B)

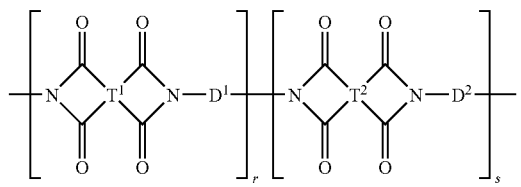

(C)

wherein

T$^1$ and T$^2$ are each independently a tetravalent organic group;

m<n;

p<q;

r<s;

D$^1$ and D$^2$ are selected from the group consisting of formula (3)-(6) as a first group and formulae (9)-(11) and (15) as a second group, wherein D$^1$ and D$^2$ are selected from different groups,

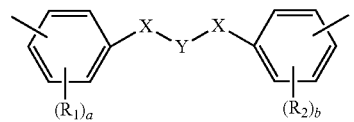

(3)

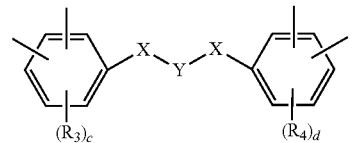

(4)

in the formulae (3) and (4),

R$_1$, R$_2$, R$_3$, and R$_4$ are each independently a monovalent organic group, a halogen atom or a hydrogen atom;

X is —O—, —SO— or —SO$_2$—; Y is a divalent organic group, and Y is diphenyl when X is —O—;

a and b are each independently an integer from 0 to 4; and c and d are each independently an integer from 0 to 3;

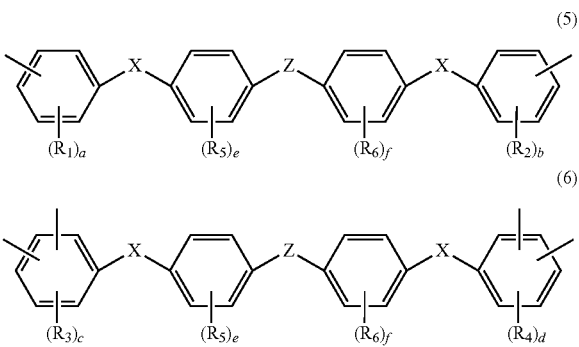

(5)

(6)

in the formulae (5) and (6),
$R_1$, $R_2$, $R_3$, $R_4$, $R_5$ and $R_6$ are each independently a monovalent organic group, a halogen atom or a hydrogen atom;
X is —O—, —S—, —SO—, —SO$_2$— or —CO—;
Z is a divalent organic group, —O—, —S—, —SO—, —SO$_2$— or —CO—, and Z is benzene ring when X is —O—, Z is not —S— when X is —S—;
a, b, e and f are each independently an integer from 0 to 4; and
c and d are each independently an integer from 0 to 3;

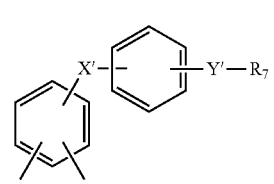

(9)

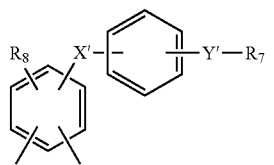

(10)

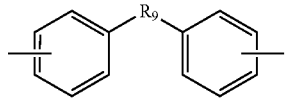

(11)

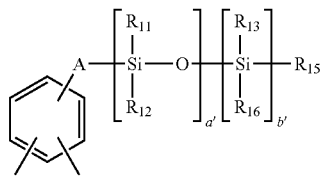

(15)

in the formulae (9)-(11) and (15),
$R_7$ is a monovalent $C_{4-40}$ alicyclic group or a monovalent $C_{8-20}$ aliphatic group;
$R_8$, $R_{11}$, $R_{12}$, $R_{13}$, $R_{14}$ and $R_{15}$ are each independently a halogen atom or a monovalent organic group;
$R_9$ is a divalent $C_{4-40}$ alicyclic group;
X' and Y' are each independently a divalent group selected from the group consisting of —O—, —NH—, —S—, —CO—, —COO—, —NHCO— and —CONH—;
A is a divalent group selected from the group consisting of —O—, —NH—, —S—, —CO—, —COO—, —OCO—, —NHCO— and —CONH—; and a' and b' are each independently an integer larger than or equal to 1.

2. The liquid crystal alignment solution according to claim 1, wherein p is larger than or equal to 0.2.

3. The liquid crystal alignment solution according to claim 1, wherein $D^1$ is selected from one of a first group consisting of formulae (3) to (6) and a second group consisting of formulae (9)-(11) and (15), and $D^2$ is selected from the other of the first group and the second group.

4. The liquid crystal alignment solution according to claim 1, further comprising an organic solvent.

5. The liquid crystal alignment solution according to claim 4, wherein the organic solvent comprises N-methyl-2-pyrrolidone, N,N-dimethylformamide, N,N-dimethyl acetamide, N-Methylcaprolactam, dimethyl sulfoxide, γ-butyrolactone, γ-butyrolactam, ethylene glycol monomethyl ether, ethylene glycol monoethyl ether, ethylene glycol n-propyl ether and ethylene glycol monobutyl ether and a combination thereof.

6. The liquid crystal alignment solution according to claim 1, further comprising an organic siloxane compound.

7. The liquid crystal alignment solution according to claim 6, wherein the organic siloxane compound comprises aminopropyl-trimethoxy-silane, aminopropyl-triethoxy-silane, vinyl-methyl-silane, N-(2-aminoethyl)-3-aminopropyl-methyl-dimethoxy-silane, N-(2-aminoethyl)-3-aminopropyl-trimethoxy-silane, vinyl-triethoxy-silane, 3-methacryloxypropyl-trimethoxy-silane, 3-epoxypropoxy-propyl-trimethoxy-silane, 3-epoxypropoxy-propyl-methyl-dimethoxy-silane, 2-(3,4-epoxycyclohexyl)-ethyl-trimethoxy-silane, 3-ureido-propyl-trimethoxy-silane, 3-ureido-propyl-triethoxy-silane, N-ethoxycarbonyl-3-aminopropyl-trimethoxysilane, N-ethoxycarbonyl-3-aminopropyl-triethoxysilane, N-triethoxysilylpropyl-triethylene-triamine, N-trimethoxysilylpropyl-triethylene-triamine, N-bis(oxyethylene)-3-aminopropyl-trimethoxy-silane, N-bis(oxyethylene)-3-aminopropyl-triethyl-silane, and a combination thereof.

8. The liquid crystal alignment solution according to claim 1, further comprising an epoxy compound.

9. The liquid crystal alignment solution according to claim 8, wherein the epoxy compound comprises ethylene glycol diglycidyl ether, propylene glycol diglycidyl ether, tripropylene glycol diglycidyl ether, neopentyl glycol diglycidyl ether, 1,6-hexanediol diglycidyl ether, glycerine diglycidyl ether, 2,2-dibromoneopentyl glycol diglycidyl ether, N,N,N',N'-tetraglycidyl-meta-xylene, 1,3-bis(N,N-diglycidylaminomethyl)cyclohexane, N,N,N',N'-tetraglycidyl-4,4'-diaminodiphenylmethane, 3-(N-propenyl-N-glycidyl)aminopropyl-trimethoxysilane, 3-(N,N-diglycidyl)aminobutyl-trimethoxysilane, and a combination thereof.

10. The liquid crystal alignment solution according to claim 1, wherein the liquid crystal alignment solution comprises a mixture of two polymers selected from the groups of the polyamide acid-polyamide acid polymer represented by formula (A), the polyimide-polyamide acid polymer represented by formula (B) and the polyimide-polyimide polymer represented by formula (C).

11. A liquid crystal alignment solution, comprising a mixture of two polymers selected from the group consisting of a polyamide acid-polyamide acid polymer represented by formula (A), a polyimide-polyamide acid polymer represented by formula (B) and a polyimide-polyimide polymer represented by formula (C), (A)

(B)
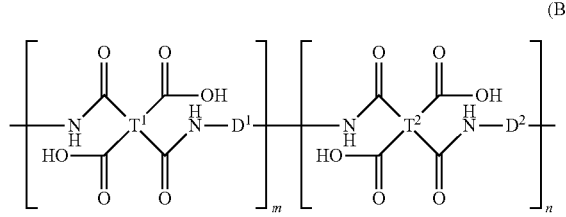

(C)
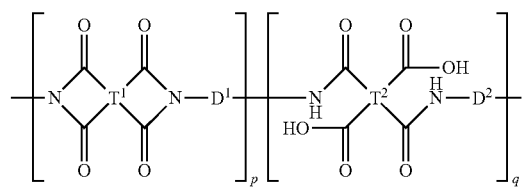

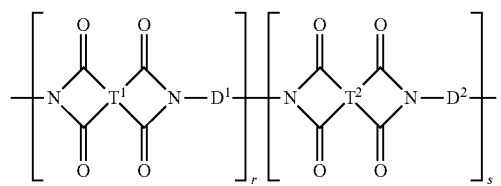

wherein $T^1$ and $T^2$ are each independently a tetravalent organic group;

$m<n$;

$p<q$;

$r<s$;

$D^1$ and $D^2$ are selected from the group consisting of formula (3)-(6) as a first group and formulae (9)-(11) and (15) as a second group, wherein $D^1$ and $D^2$ are selected from different groups, (3)
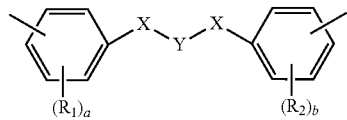

(4)
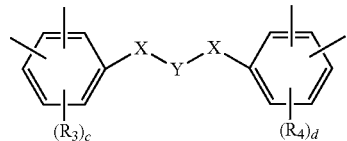

in the formulae (3) and (4), $R_1$, $R_2$, $R_3$, and $R_4$ are each independently a monovalent organic group, a halogen atom or a hydrogen atom;

X is —O—, —SO— or —SO$_2$—; Y is a divalent organic group, and Y is diphenyl when X is —O—;

a and b are each independently an integer from 0 to 4; and c and d are each independently an integer from 0 to 3;

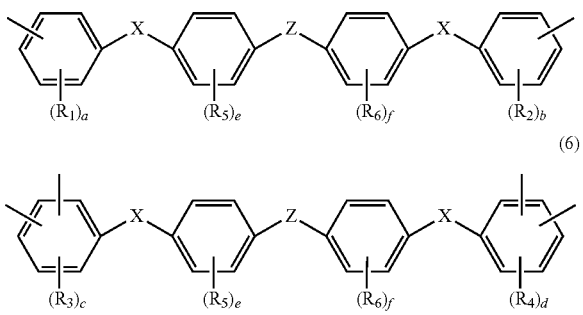

in the formulae (5) and (6), $R_1$, $R_2$, $R_3$, $R_4$, $R_5$ and $R_6$ are each independently a monovalent organic group, a halogen atom or a hydrogen atom;

X is —O—, —S—, —SO—, —SO$_2$— or —CO—;

Z is a divalent organic group, —O—, —S—, —SO—, —SO$_2$— or —CO—, and Z is benzene ring when X is —O—, Z is not —S— when X is —S—;

a, b, e and f are each independently an integer from 0 to 4; and c and d are each independently an integer from 0 to 3;

(9)
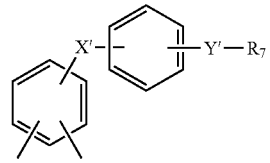

(10)
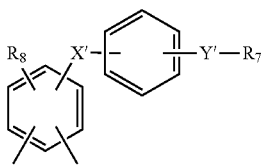

(11)
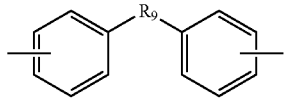

(15)
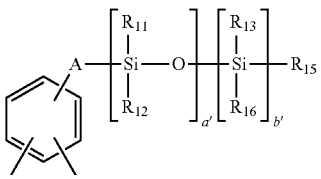

in the formulae (9)-(11) and (15), $R_7$ is a monovalent $C_{4-40}$ alicyclic group or a monovalent $C_{8-20}$ aliphatic group;

$R_8$, $R_{11}$, $R_{12}$, $R_{13}$, $R_{14}$ and $R_{15}$ are each independently a halogen atom or a monovalent organic group;

$R_9$ is a divalent $C_{4-40}$ alicyclic group;

X' and Y' are each independently a divalent group selected from the group consisting of —O—, —NH—, —S—, —CO—, —COO—, —OCO—, —NHCO— and —CONH—;

A is a divalent group selected from the group consisting of —O—, —NH—, —S—, —CO—, —COO—, —OCO—, —NHCO— and —CONH—; and a' and b' are each independently an integer larger than or equal to 1, wherein at least one of $D^1$ and $D^2$ in one of the two polymers is selected from the group consisting of above formulae (3)-(6), and at least one of $D^1$ and $D^2$ in another of the two polymers is selected from the group consisting of formulae (9)-(11) and (15) and formulae (7), (8), (12), (13), and (14),

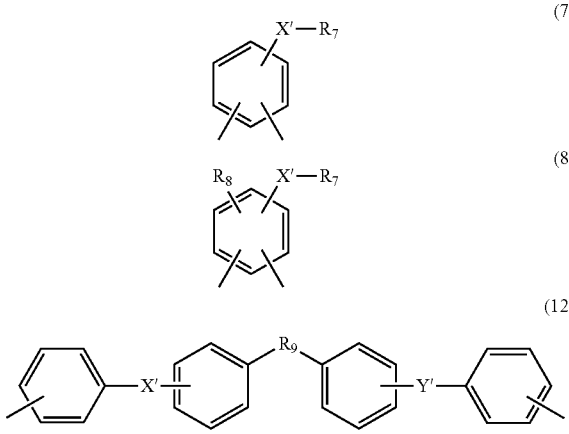

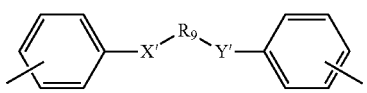

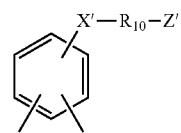

in the formulae (7)-(8) and (12)-(14), $R_7$ is a monovalent $C_{4-40}$ alicyclic group or a monovalent $C_{8-20}$ aliphatic group;

$R_8$ is a halogen atom or a monovalent organic group;

$R_9$ and $R_{10}$ are each independently a divalent $C_{4-40}$ alicyclic group;

X' and Y' are each independently a divalent group selected from the group consisting of —O—, —NH—, —S—, —CO—, —COO—, —OCO—, —NHCO— and —CONH—; and Z' is a monovalent group selected from the group consisting of —CF$_3$, —CN, COCH$_3$, —COOH, —NO$_2$, SOCH$_3$, —SO$_2$CH$_3$, —OCF$_3$, —F and —Cl.

* * * * *